(12) United States Patent
Sawano

(10) Patent No.: US 12,542,433 B2
(45) Date of Patent: Feb. 3, 2026

(54) BLOWN FUSE DETECTION APPARATUS, BLOWN FUSE DETECTION METHOD, AND COMPUTER PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Shunichi Sawano, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

(*) Notice: Subject to any disclaimer, the term of this patent is extended or adjusted under 35 U.S.C. 154(b) by 385 days.

(21) Appl. No.: 18/245,360

(22) PCT Filed: Jul. 21, 2021

(86) PCT No.: PCT/JP2021/027367
§ 371 (c)(1),
(2) Date: Sep. 27, 2023

(87) PCT Pub. No.: WO2022/059347
PCT Pub. Date: Mar. 24, 2022

(65) Prior Publication Data
US 2024/0055851 A1    Feb. 15, 2024

(30) Foreign Application Priority Data
Sep. 18, 2020 (JP) .................. 2020-157027

(51) Int. Cl.
*H02H 3/04*    (2006.01)
*G01R 31/74*    (2020.01)

(52) U.S. Cl.
CPC ............. *H02H 3/046* (2013.01); *G01R 31/74* (2020.01)

(58) Field of Classification Search
CPC ................................ G01R 31/66; G01R 31/69
See application file for complete search history.

(56) References Cited

U.S. PATENT DOCUMENTS

2001/0033176 A1    10/2001    Klaar
2012/0133477 A1*   5/2012    West ................. H01H 85/46
                                                337/4

(Continued)

FOREIGN PATENT DOCUMENTS

DE    102007054297 A1    5/2009
JP        H4-77681 A     3/1992

(Continued)

OTHER PUBLICATIONS

International Search Report, Application No. PCT/JP2021/027367, mailed Sep. 21, 2021. ISA/Japan Patent Office.

*Primary Examiner* — AKM Zakaria
(74) *Attorney, Agent, or Firm* — Honigman LLP

(57) ABSTRACT

A plurality of fuses (F1, F2, . . . , and Fn) are respectively disposed on current paths for a plurality of currents branched from one end of a DC power source (10). In a blown fuse detection apparatus (11), ends on one side of a plurality of capacitors (C1, C2, . . . , Cn) are respectively connected to the ends on the downstream side of the plurality of fuses (F1, F2, . . . , and Fn). A plurality of currents that have flowed through the capacitors (C1, C2, . . . , Cn) are input to a circuit switch (30) and a circuit resistor (31). A microcomputer (37) instructs that the circuit switch (30) be switched on, obtains a detected value of a resistance voltage, and detects, based on the obtained detected value, whether or not there is a blown fuse among the fuses (F1, F2, . . . , and Fn).

11 Claims, 12 Drawing Sheets

(56) References Cited

U.S. PATENT DOCUMENTS

| | | | |
|---|---|---|---|
| 2014/0034613 A1* | 2/2014 | West | H01H 33/596 |
| | | | 218/4 |
| 2016/0139195 A1 | 5/2016 | Chen et al. | |
| 2019/0207508 A1* | 7/2019 | Tsukamoto | H02M 1/14 |

FOREIGN PATENT DOCUMENTS

| | | |
|---|---|---|
| JP | H5-30634 A | 2/1993 |
| JP | 2003-212065 A | 7/2003 |
| JP | 2020-089138 A | 6/2020 |
| JP | 2020-156171 A | 9/2020 |

\* cited by examiner $Vr = Vb \cdot \exp(-\frac{t}{\tau})$ $\tau = (n-k) \cdot q \cdot r$ Vr: Resistance Voltage Value
Vb: Power Source Voltage Value Resistance Voltage Value When Target Time Elapsed

| | | Number Of Blown Fuses | | | | |
|---|---|---|---|---|---|---|
| | | 0 | 1 | 2 | ... | n−1 |
| Power Source Voltage Value [V] | 14.0 | ... | ... | ... | | ... |
| | 13.9 | ... | ... | ... | | ... |
| | 13.8 | ... | ... | ... | ... | ... |
| | ⋮ | ⋮ | ⋮ | ⋮ | | ⋮ |
| | 12.0 | ... | ... | ... | | ... |
| | ⋮ | ⋮ | ⋮ | ⋮ | | ⋮ |

# BLOWN FUSE DETECTION APPARATUS, BLOWN FUSE DETECTION METHOD, AND COMPUTER PROGRAM

CROSS-REFERENCE TO RELATED APPLICATIONS

This application is the U.S. national stage of PCT/JP2021/027367 filed on Jul. 21, 2021, which claims priority of Japanese Patent Application No. JP 2020-157027 filed on Sep. 18, 2020, the contents of which are incorporated herein.

TECHNICAL FIELD

The present disclosure relates to a blown fuse detection apparatus, a blown fuse detection method, and a computer program.

BACKGROUND

JP 2003-212065A discloses a vehicle power source system in which power is supplied from a DC power source to a load. In this power source system, a fuse is disposed on a current path for a current flowing from the positive electrode of the DC power source to the load. The load is an electric device that is mounted in a vehicle.

As a power source system, there is a power source system in which a DC power source supplies power to a plurality of loads. In this power source system, fuses are respectively disposed on current paths for a plurality of currents branched from the positive electrode of the DC power source. Usually, in a power source system that includes a large number of loads, namely, a large number of fuses, which fuse corresponds to which load is not grasped in many cases. In addition, when one load is not operating, as a reason for the load not being operating, it is conceivable that a fuse disposed on the current path to the load is blown.

When there are a large number of fuses and one load is not operating, a vehicle dealer, for example, needs to check whether or not each of the plurality of fuses is blown. The dealer can check whether or not a fuse is blown by measuring a voltage between the two ends of the fuse using a tester, for example. However, it takes a long time for the dealer to check whether or not each of a plurality of fuses is blown, which is thus inefficient.

In view of this, an object of the present disclosure is to provide a blown fuse detection apparatus, a blown fuse detection method, and a computer program for appropriately detecting whether or not there is a blown fuse among a plurality of fuses.

SUMMARY

A blown fuse detection apparatus according to one aspect of the present disclosure is a blown fuse detection apparatus for detecting whether or not there is a blown fuse among a plurality of fuses respectively disposed on a plurality of current paths branched from one end of a DC power source, the blown fuse detection apparatus including: a plurality of capacitors that are respectively connected to ends on a downstream side of the plurality of fuses, a circuit switch and a circuit resistor to which a plurality of currents that have flowed through the plurality of capacitors are input, and a processing unit that executes processing, the processing unit instructing that the circuit switch be switched on, obtaining a detected value of a resistance voltage between two ends of the circuit resistor that decreases with a lapse of time in a state where the circuit switch is on, and detecting, based on the obtained detected value, whether or not there is a blown fuse among the plurality of fuses.

A blown fuse detection method according to one aspect of the present disclosure is a blown fuse detection method for detecting, by a computer, whether or not there is a blown fuse among a plurality of fuses respectively disposed on a plurality of current paths branched from one end of a DC power source, in a circuit that includes a plurality of capacitors that are respectively connected to ends on a downstream side of the plurality of fuses, and a circuit switch and a circuit resistor to which a plurality of currents that have flowed through the plurality of capacitors are input, the computer executing a step of instructing that the circuit switch be switched on, a step of obtaining a detected value of a resistance voltage between two ends of the circuit resistor that decreases with a lapse of time in a state where the circuit switch is on, and a step of detecting, based on the obtained detected value, whether or not there is a blown fuse among the plurality of fuses.

A computer program according to one aspect of the present disclosure is a computer program for detecting whether or not there is a blown fuse among a plurality of fuses respectively disposed on a plurality of current paths branched from one end of a DC power source, in a circuit that includes a plurality of capacitors that are respectively connected to ends on a downstream side of the plurality of fuses, and a circuit switch and a circuit resistor to which a plurality of currents that have flowed through the plurality of capacitors are input, the computer program causing a computer to execute a step of instructing that the circuit switch be switched on, a step of obtaining a detected value of a resistance voltage between two ends of the circuit resistor that decreases with a lapse of time in a state where the circuit switch is on, and a step of detecting, based on the obtained detected value, whether or not there is a blown fuse among the plurality of fuses.

Note that the present disclosure can be realized not only as a blown fuse detection apparatus that includes the above-described characteristic processing units, but also as a blown fuse detection method that includes the above-described characteristic processing as steps, or a computer program for causing a computer to execute the steps. In addition, the present disclosure can be realized as a semiconductor integrated circuit that realizes a portion or all of the blown fuse detection apparatus, or as a power source system that includes the blown fuse detection apparatus.

According to the present disclosure, whether or not there is a blown fuse among a plurality of fuses is appropriately detected.

DETAILED DESCRIPTION OF PREFERRED EMBODIMENTS

Figure 1:
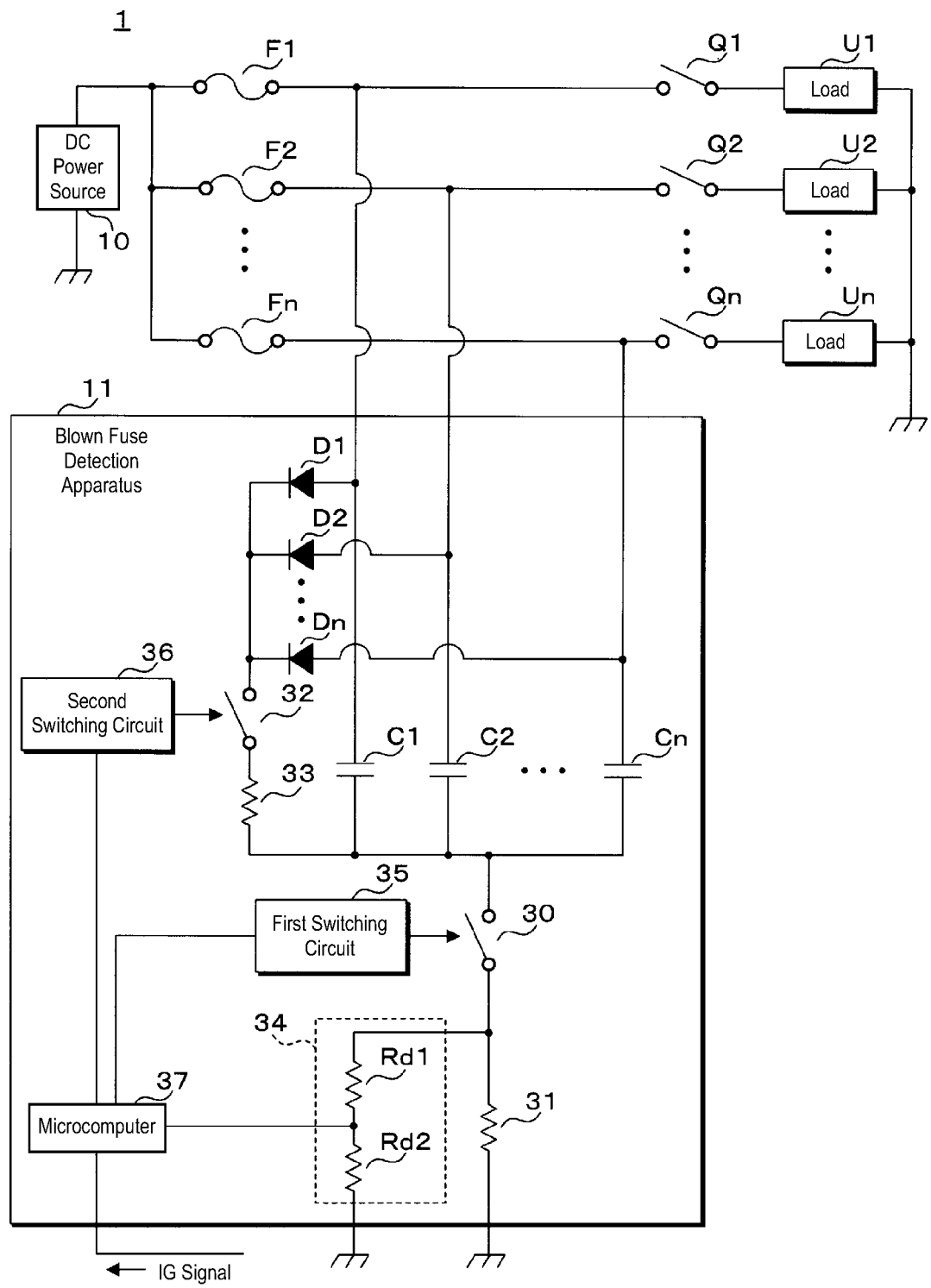
FIG. 1 is a block diagram showing a main configuration of a power source system according to a first embodiment.

First, embodiments of the present disclosure will be listed and described. At least some of the embodiments to be described below may be suitably combined.

First Aspect

In accordance with a first aspect, a blown fuse detection apparatus according to an aspect of the present disclosure is a blown fuse detection apparatus for detecting whether or not there is a blown fuse among a plurality of fuses respectively disposed on a plurality of current paths branched from one end of a DC power source, the blown fuse detection apparatus including: a plurality of capacitors that are respectively connected to ends on a downstream side of the plurality of fuses, a circuit switch and a circuit resistor to which a plurality of currents that have flowed through the plurality of capacitors are input, and a processing unit that executes processing, the processing unit instructing that the circuit switch be switched on, obtaining a detected value of a resistance voltage between two ends of the circuit resistor that decreases with a lapse of time in a state where the circuit switch is on, and detecting, based on the obtained detected value, whether or not there is a blown fuse among the plurality of fuses.

Second Aspect

In a second aspect, in the blown fuse detection apparatus according to an aspect of the present disclosure, the processing unit obtains the detected value of the resistance voltage over time in a state where the circuit switch is on, determines a time constant of the resistance voltage based on the plurality of obtained detected values, and detects, based on the determined time constant, whether or not there is a blown fuse among the plurality of fuses.

Third Aspect

In a third aspect, in the blown fuse detection apparatus according to an aspect of the present disclosure, the processing unit determines whether or not a power source voltage of the DC power source changed while the plurality of detected values were obtained.

Fourth Aspect

In a fourth aspect, in the blown fuse detection apparatus according to an aspect of the present disclosure, the processing unit inputs the plurality of obtained detected values to a learned model that has been trained on a relation between a time constant of the resistance voltage and a plurality of detected values of the resistance voltage, and determines the time constant of the resistance voltage based on output from the learned model.

Fifth Aspect

In a fifth aspect, in the blown fuse detection apparatus according to an aspect of the present disclosure, the processing unit obtains a power source voltage value of the DC power source, obtains a detected value of the resistance voltage at a time point when a predetermined time has elapsed since the circuit switch was switched on, and detects, based on the obtained power source voltage value and detected value, whether or not there is a blown fuse among the plurality of fuses.

Sixth Aspect

In a sixth aspect, in the blown fuse detection apparatus according to an aspect of the present disclosure, the processing unit determines whether or not the power source voltage of the DC power source changed during a period from when the processing unit instructed that the circuit switch be switched on until when the predetermined time elapsed.

Seventh Aspect

In a seventh aspect, the blown fuse detection apparatus according to an aspect of the present disclosure further includes: a diode whose anode is connected to the one end of the DC power source, and a discharge switch and a discharge resistor through which a current output from a cathode of the diode flows, and, when the discharge switch is on, a current flows from ends on one side of the capacitors through the fuse, the diode, the discharge resistor, and ends on the other side of the capacitors in the stated order.

Eighth Aspect

In an eighth aspect, the blown fuse detection apparatus according to one aspect of the present disclosure further includes: a plurality of diodes whose anodes are respectively connected to ends on a downstream side of the plurality of fuses, and a discharge switch and a discharge resistor through which a current output from cathodes of the plurality of diodes flow, and, when the discharge switch is on, a current flows from ends on one side of the capacitors through the diodes, the discharge resistor, and ends on the other side of the capacitors in the stated order.

Ninth Aspect

In a ninth aspect, the blown fuse detection apparatus according to an aspect of the present disclosure, the processing unit determines whether or not all of the plurality of fuses are blown, based on whether or not the obtained detected value indicates 0 V.

Tenth Aspect

In a tenth aspect, a blown fuse detection method according to one aspect of the present disclosure is a blown fuse detection method for detecting, by a computer, whether or not there is a blown fuse among a plurality of fuses respectively disposed on a plurality of current paths branched from one end of a DC power source, in a circuit that includes a plurality of capacitors that are respectively connected to ends on a downstream side of the plurality of fuses, and a circuit switch and a circuit resistor to which a plurality of currents that have flowed through the plurality of capacitors are input, the computer executing a step of instructing that the circuit switch be switched on, a step of obtaining a detected value of a resistance voltage between two ends of the circuit resistor that decreases with a lapse of time in a state where the circuit switch is on, and a step of detecting, based on the obtained detected value, whether or not there is a blown fuse among the plurality of fuses.

Eleventh Aspect

In an eleventh aspect, a computer program according to an aspect of the present disclosure is a computer program for detecting whether or not there is a blown fuse among a plurality of fuses respectively disposed on a plurality of current paths branched from one end of a DC power source, in a circuit that includes a plurality of capacitors that are respectively connected to ends on a downstream side of the plurality of fuses, and a circuit switch and a circuit resistor to which a plurality of currents that have flowed through the plurality of capacitors are input, the computer program causing a computer to execute a step of instructing that the circuit switch be switched on, a step of obtaining a detected value of a resistance voltage between two ends of the circuit resistor that decreases with a lapse of time in a state where the circuit switch is on, and a step of detecting, based on the obtained detected value, whether or not there is a blown fuse among the plurality of fuses.

Twelfth Aspect

In a twelfth aspect, in the blown fuse detection apparatus, the blown fuse detection method, and the computer program according to the eleventh aspect, when the circuit switch is switched on in a state where the plurality of capacitors do not store power, the resistance voltage decreases from the power source voltage value of the DC power source with the lapse of time. The time constant of the resistance voltage is expressed as the product of the sum of electrostatic capacitances of one or more capacitors connected to fuses that are not blown and the resistance value of the circuit resistor. Therefore, the larger the number of blown fuses is, the smaller the time constant becomes. The smaller the time constant is, the faster the resistance voltage decreases. Therefore, whether or not there is a blown fuse among a plurality of fuses is appropriately detected based on a detected value of the resistance voltage.

Thirteenth Aspect

In a thirteenth aspect, in the blown fuse detection apparatus according to the twelfth aspect, a time constant of the resistance voltage is determined based on a plurality of obtained detected values. If the determined time constant is lower than a time constant of a resistance voltage when none of the fuses are blown, the presence of a blown fuse is detected.

Fourteenth Aspect

In a fourteenth aspect, in the blown fuse detection apparatus according to the thirteenth aspect, when the power source voltage of the DC power source changes while a plurality of detected values are obtained, that is, a plurality of detected values are detected, an appropriate detected value cannot be obtained. For this reason, a determination is performed as to whether or not the power source voltage changed while a plurality of detected values are obtained.

Fifteenth Aspect

In a fifteenth aspect, in the blown fuse detection apparatus according to the fourteenth aspect, a plurality of obtained detected values are input to a learned model. Accordingly, the learned model outputs, for each of a plurality of preset time constants, information indicating a probability corresponding to the time constant of the resistance voltage, for example. The time constant of the resistance voltage is determined based on output of the learned model.

Sixteenth Aspect

In a sixteenth aspect, in the blown fuse detection apparatus according to the fifteenth aspect, the resistance voltage value at the time point when the predetermined time has elapsed since the circuit switch was switched on changes in accordance with the power source voltage value of the DC power source and the time constant. As described above, when at least one of the plurality of fuses is blown, the time constant of the resistance voltage decreases. Therefore, the resistance voltage value at the time point when the predetermined time has elapsed since the circuit switch was switched on is low. If an obtained detected value is lower than the resistance voltage value at the time point when the predetermined time has elapsed since the circuit switch was switched on in a state where the number of blown fuses is 0, the presence of a blown fuse is detected.

Seventeenth Aspect

In a seventeenth aspect, in the blown fuse detection apparatus according to the sixteenth aspect, if the power source voltage of the DC power source changed during a period from when the circuit switch was switched on until when the predetermined time elapsed, an appropriate detected value of the resistance voltage cannot be obtained. For this reason, a determination is performed as to whether or not the power source voltage of the DC power source changed during a period from when an instruction to switch the circuit switch on was given until when the predetermined time elapsed.

Eighteenth Aspect

In an eighteenth aspect, in the blown fuse detection apparatus according to the seventeenth aspect, the anode of the diode is connected to one end of the DC power source. When the discharge switch is switched on, the plurality of capacitors discharge via the discharge resistor.

Nineteenth Aspect

In a nineteenth aspect, in the blown fuse detection apparatus according to the eighteenth aspect, the anodes of the plurality of diodes are connected to the ends on the downstream side of the plurality of fuses. When the discharge switch is switched on, the plurality of capacitors discharge via the discharge resistor.

Twentieth Aspect

In a twentieth aspect, in the blown fuse detection apparatus according to the nineteenth aspect, in a case where all of the fuses are blown, even when the circuit switch is on, a current does not flow through the circuit resistor. For this reason, at a time point when the circuit switch is switched on, the resistance voltage is already 0 V. When the detected value of the resistance voltage is 0 V a microcomputer detects fusing of all of the fuses.

Specific examples of a power source system according to an embodiment of the present disclosure will be described below with reference to the diagrams. Note that the present disclosure is not limited to these examples, and is defined by the scope of the claims, and all modifications that are equivalent to or within the scope of the claims are intended to be included.

First Embodiment

Configuration of Power Source System

FIG. 1 is a block diagram showing a main configuration of a power source system 1 according to a first embodiment. The power source system 1 is mounted in a vehicle. The power source system 1 includes a DC power source 10, a blown fuse detection apparatus 11, n fuses F1, F2, ..., and Fn, n power supply switches Q1, Q2, ..., Qn, and n loads U1, U2, ..., and Un. Here, n is an integer of 2 or more.

Hereinafter, an integer that is greater than or equal to 1 and smaller than or equal to n is denoted by "i". The integer i may be any integer that is greater than or equal to 1 and smaller than or equal to n.

One end of the DC power source 10 is connected to one end of a fuse Fi. The other end of the fuse Fi is connected to one end of a power supply switch Qi. The other end of the power supply switch Qi is connected to one end of a load Ui. The negative electrode of the DC power source 10 and the other end of the load Ui are grounded. A connection node between the fuse Fi and the power supply switch Qi is connected to the blown fuse detection apparatus 11. The blown fuse detection apparatus 11 is also grounded.

The load Ui is an electric device mounted in the vehicle. When the power supply switch Qi is switched from off to on, a current flows from the one end of the DC power source 10 through the fuse Fi, the power supply switch Qi, the load Ui, and the other end of the DC power source 10 in the stated order, and the DC power source 10 supplies power to the load Ui. When power is supplied from the DC power source 10 to the load Ui, the load Ui is activated. When the power supply switch Qi is switched from on to off, flow of a current through the power supply switch Qi stops, and power supply from the DC power source 10 to the load Ui stops. When power supply to the load Ui stops, the load Ui stops operating.

In a state where the n fuses F1, F2, ..., and Fn are not blown, and the n power supply switches Q1, Q2, ..., Qn are on, n currents branched from the one end of the DC power source 10 flow through the n fuses F1, F2, ..., and Fn, respectively. Therefore, the n fuses F1, F2, ..., and Fn are respectively disposed on current paths for the n currents branched from the one end of the DC power source 10. The blown fuse detection apparatus 11 is connected to the end on the downstream side of each of the n fuses F1, F2, ..., and Fn.

Figure 2:
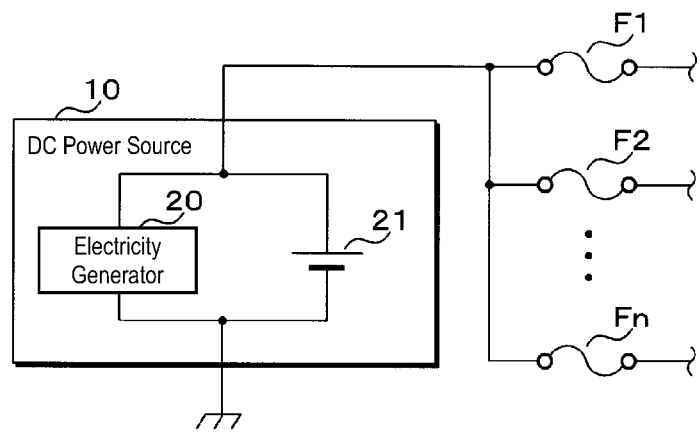
FIG. 2 is a block diagram showing a main configuration of a DC power source.

FIG. 2 is a block diagram showing a main configuration of the DC power source 10. The DC power source 10 includes an electricity generator 20 and a battery 21. One end of the electricity generator 20 is connected to the positive electrode of the battery 21 and the end on the upstream side of the fuse Fi. The positive electrode of the battery 21 corresponds to the aforementioned one end of the DC power source 10. The other end of the electricity generator 20 is connected to the negative electrode of the battery 21. The negative electrode of the battery 21 is grounded. Hereinafter, the voltage of the positive electrode of the battery 21 is referred to as a "power source voltage". A reference potential of the power source voltage is a ground potential.

An engine (not illustrated) is mounted in the vehicle. The electricity generator 20 generates AC power in conjunction with the engine, and rectifies the generated AC power to DC power. When the electricity generator 20 is generating electricity, a DC voltage corresponding to rectified DC power is output as an output voltage. The output voltage of the electricity generator 20 is higher than an output voltage of the battery 21. A reference potential for an output voltage of each of the electricity generator 20 and the battery 21 is a ground potential.

An internal resistor (not illustrated) is provided in each of the electricity generator 20 and the battery 21, and a voltage is output via the internal resistor. For this reason, in the electricity generator 20 and the battery 21, the larger the current value of a current flowing through the internal resistor is, the lower the output voltage becomes. Assume that the load U1 is a starter for starting the engine, for example. In this case, the load U1 is activated when the electricity generator 20 is not generating electricity. When the power supply switch Q1 is switched on, a large current is supplied from the battery 21 to the load U1. At this time, a large voltage drop occurs in the internal resistor of the battery 21, and the output voltage of the battery 21, that is, the power source voltage of the DC power source 10 decreases.

As described above, the power source voltage of the DC power source 10 changes in accordance with whether or not the electricity generator 20 is generating electricity, and whether or not a large current load to which a large current is supplied is operating. The large current load is one of the n loads U1, U2, ..., and Un.

Note that the n loads U1, U2, ..., and Un do not need to include a large current load. An example will be described below in which the n loads U1, U2, ..., and Un include a large current load.

When the electricity generator 20 is generating electricity the power source voltage of the DC power source 10 is an output voltage of the electricity generator 20, and the electricity generator 20 charges the battery 21. When the electricity generator 20 is not generating electricity, the power source voltage of the DC power source 10 is an output voltage of the battery 21. Assume that the fuse Fi is not blown and the power supply switch Qi is on. In this case, when the electricity generator 20 is generating electricity, the electricity generator 20 supplies power to the load Ui. In a similar case, when the electricity generator 20 is not generating electricity, the battery 21 supplies power to the load Ui.

When the current value of a current flowing through the fuse Fi is greater than or equal to a predetermined current value, the fuse Fi is blown. When the fuse Fi is blown, flow of a current through the fuse Fi stops. The fuse Fi prevents an overcurrent that is larger than or equal to the predetermined current value from continuously flowing for a long period.

Note that predetermined current values for the n fuses F1, F2, ..., and Fn may be the same. In addition, the predetermined current value for the fuse Fi may be different from at least one of the predetermined current values for the other fuses.

When the ignition switch of the vehicle is switched on, an IG signal is input to the blown fuse detection apparatus 11 shown in FIG. 1. When an IG signal is input, the blown fuse detection apparatus 11 detects whether or not there is a blown fuse among the n fuses F1, F2, ..., and Fn, and whether or not all of the n fuses F1, F2, ..., and Fn are blown. When the presence of a blown fuse is detected, the blown fuse detection apparatus 11 determines the number of blown fuses.

Configuration of Blown Fuse Detection Apparatus 11

As shown in FIG. 1, the blown fuse detection apparatus 11 includes a circuit switch 30, a circuit resistor 31, a discharge switch 32, a discharge resistor 33, a voltage detection circuit 34, a first switching circuit 35, a second switching circuit 36, a microcomputer (hereinafter, referred to as "MICOM") 37, n capacitors C1, C2, ..., and Cn, and n diodes D1, D2, ..., and Dn. The voltage detection circuit 34 includes two voltage divider resistors Rd1 and Rd2.

One end of the capacitor Ci is connected to the one end on the downstream side of the fuse Fi. The other ends of the n capacitors C1, C2, ..., and Cn are connected to one end of the circuit switch 30. The other end of the circuit switch 30 is connected to one end of the circuit resistor 31. The other end of the circuit resistor 31 is grounded. The anode of the diode Di is also connected to the one end on the downstream side of the fuse Fi. The cathodes of the n diodes D1, D2, ..., and Dn are connected to one end of the discharge switch 32. The other end of the discharge switch 32 is connected to one end of the discharge resistor 33. The other end of the discharge resistor 33 is connected to a connection node between the capacitor Ci and the circuit switch 30.

One end of the voltage divider resistor Rd1 is connected to the connection node between the circuit switch 30 and the circuit resistor 31. In the voltage detection circuit 34, the other end of the voltage divider resistor Rd1 is connected to one end of the voltage divider resistor Rd2. The other end of the voltage divider resistor Rd2 is grounded. The connection node between the two voltage divider resistors Rd1 and Rd2 is connected to the MICOM 37. The MICOM 37 is connected to the first switching circuit 35 and the second switching circuit 36, individually.

The MICOM 37 outputs a first instruction signal indicating a high-level voltage or a low-level voltage to the first switching circuit 35. The MICOM 37 also outputs a second instruction signal indicating the high-level voltage or the low-level voltage to the second switching circuit 36. When the voltage indicated by the first instruction signal is switched from the low-level voltage to the high-level voltage, the first switching circuit 35 switches the circuit switch 30 on. When the voltage indicated by the first instruction signal is switched from the high-level voltage to the low-level voltage, the first switching circuit 35 switches the circuit switch 30 off.

Similarly, when the voltage indicated by the second instruction signal is switched from the low-level voltage to the high-level voltage, the second switching circuit 36 switches the discharge switch 32 on. When the voltage indicated by the second instruction signal is switched from the high-level voltage to the low-level voltage, the second switching circuit 36 switches the discharge switch 32 off.

An IG signal is input to the MICOM 37. Until immediately before an IG signal is input, the MICOM 37 maintains the voltages indicated by the first instruction signal and the second instruction signal at the low-level voltage and the high-level voltage, respectively. For this reason, the first switching circuit 35 maintains the circuit switch 30 off, and the second switching circuit 36 maintains the discharge switch 32 on.

When the discharge switch 32 is on and power is stored in the capacitor Ci, a current flows from the one end of the capacitor Ci through the diode Di, the discharge switch 32, the discharge resistor 33, and the other end of the capacitor Ci in the stated order, and the capacitor Ci discharges.

Therefore, when the discharge switch 32 is switched on in a state where power is stored in the n capacitors C1, C2, ..., and Cn, currents are output from the cathodes of the n diodes D1, D2, ..., and Dn. The currents output from the cathodes of the n diodes D1, D2, ..., and Dn flow through the discharge switch 32 and the discharge resistor 33.

As described above, an IG signal is input to the MICOM 37 in a state where the voltages indicated by the first instruction signal and the second instruction signal are respectively maintained at the low-level voltage and the high-level voltage. When an IG signal is input, the MICOM 37 switches the voltage indicated by the second instruction signal from the high-level voltage to the low-level voltage. Accordingly, the second switching circuit 36 switches the discharge switch 32 off Next, the MICOM 37 switches the first signal from the low-level voltage to the high-level voltage. Accordingly, the first switching circuit 35 switches the circuit switch 30 on in a state where the discharge switch 32 is off.

In this case, when the fuse Fi is not blown, a current flows from the one end of the DC power source 10 through the fuse Fi, the capacitor Ci, and the circuit switch 30 in the stated order until the voltage between the two ends of the capacitor Ci matches the power source voltage of the DC power source 10. A portion of the current output from the one end on the downstream side of the circuit switch 30 flows through the circuit resistor 31 and the other end of the DC power source 10 in the stated order. The remaining current output from the one end on the downstream side of the circuit switch 30 flows through the voltage divider resistors Rd1 and Rd2 and the other end of the DC power source 10 in the stated order.

Here, a combined resistance value of the voltage divider resistors Rd1 and Rd2 is sufficiently larger than the resistance value of the circuit resistor 31. For this reason, the current value of a current flowing through the circuit resistor 31 is sufficiently larger than the current value of a current flowing through the voltage divider resistors Rd1 and Rd2. As a result, the current value of a current flowing through the circuit switch 30 substantially matches the current value of the current flowing through the circuit resistor 31.

When the n fuses F1, F2, ..., and Fn are not blown, and the circuit switch 30 is switched on, n currents flow through the n capacitors C1, C2, ..., and Cn. As described above, the current value of a current flowing through the circuit switch 30 substantially matches the current value of a current flowing through the circuit resistor 31, and thus the n currents are input to the circuit switch 30 and the circuit resistor 31.

Hereinafter, the voltage between the two ends of the circuit resistor 31 is referred to as a "resistance voltage". The voltage detection circuit 34 detects a resistance voltage, and outputs analog detection information indicating the detected value to the MICOM 37. Inside the voltage detection circuit

34, the voltage divider resistors Rd1 and Rd2 divide the resistance voltage. The voltage divider resistors Rd1 and Rd2 outputs a voltage value obtained by dividing the resistance voltage to the MICOM 37 as analog detection information. The MICOM 37 can calculate a detected value of the resistance voltage based on a voltage division ratio that is determined using the resistance values of the voltage divider resistors Rd1 and Rd2, and the detection information.

The MICOM 37 repeatedly obtains detection information output from the voltage detection circuit 34. When the number of pieces of obtained detection information reaches a predetermined number, the MICOM 37 switches the voltage indicated by the first instruction signal to the high-level voltage. Accordingly, the first switching circuit 35 switches the circuit switch 30 off. The MICOM 37 then switches the voltage indicated by the second instruction signal to the high-level voltage. Accordingly, the second switching circuit 36 switches the discharge switch 32 on. As described above, when the discharge switch 32 is switched on, a capacitor that stores electricity among the n capacitors C1, C2, . . . , and Cn discharge via the discharge resistor 33.

The MICOM 37 detects, based on a plurality of detected values indicated by a plurality of pieces of obtained detection information, whether or not there is a blown fuse among the n fuses F1, F2, . . . , and Fn, and whether or not all of the n fuses F1, F2, . . . , and Fn are blown.

Figure 3:
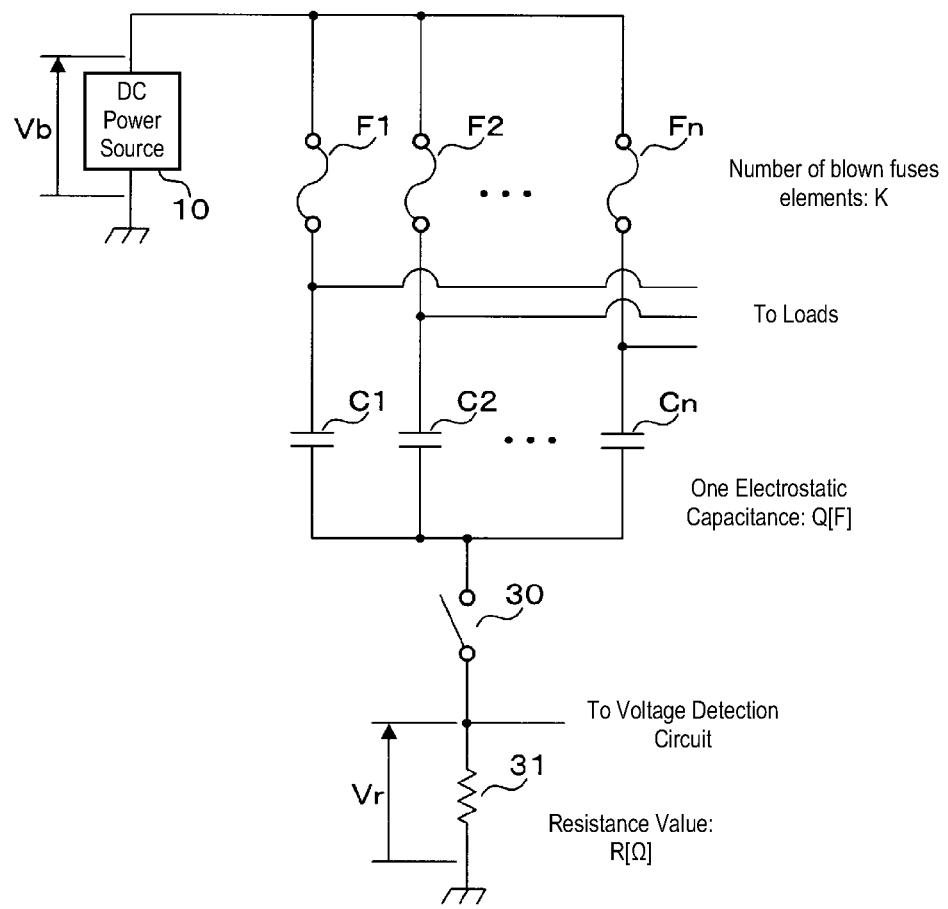
FIG. 3 is a diagram illustrating a detection method that is performed by a microcomputer.
Figure 3:
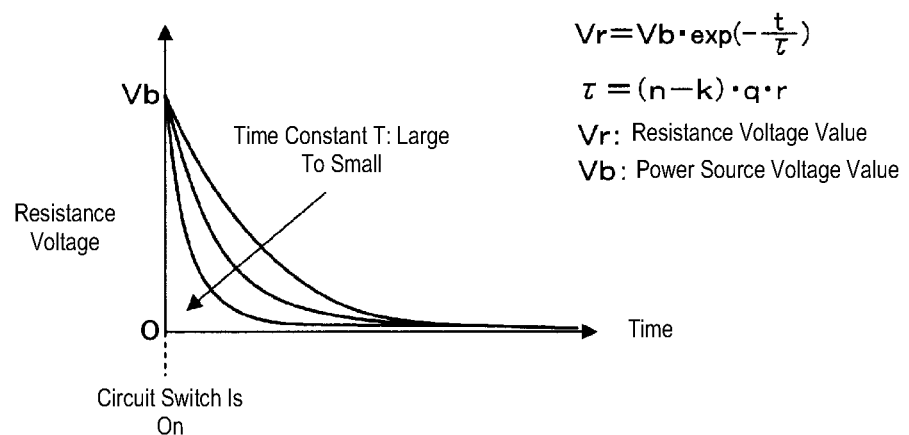

FIG. 3 is a diagram illustrating a detection method that is performed by the MICOM 37. A power source voltage value that is the value of the power source voltage of the DC power source 10 is denoted by Vb. A resistance voltage value that is the value of a resistance voltage is denoted by Vr. The number of blown fuses among the n fuses F1, F2, . . . , and Fn is denoted by an integer k. The integer k is greater than or equal to 0 and smaller than or equal to (n−1). The electrostatic capacitances of the n capacitors C1, C2, . . . , and Cn are the same. Each of the electrostatic capacitances of the n capacitors C1, C2, . . . , and Cn is denoted by q. The resistance value of the circuit resistor 31 is indicated by r. A time that has elapsed since the circuit switch 30 was switched on is denoted by t.

Note that the n electrostatic capacitances being the same does not mean that the n electrostatic capacitances are only completely the same. A state where the n electrostatic capacitances are the same includes a state where the difference between the maximum value and the minimum value of the n electrostatic capacitances is within an error range.

The lower part of FIG. 3 shows a change in the resistance voltage that is the voltage between the two ends of the circuit switch 30. The horizontal axis indicates the time t. As shown in FIG. 3, when the circuit switch 30 is switched on, the resistance voltage decreases from the power source voltage value Vb with the lapse of time. The resistance voltage value Vr satisfies Expression (1) below.

$$Vr = Vb \cdot \exp(-t/\tau) \quad (1)$$

Here, "τ" indicates a time constant of the resistance voltage. "·" indicates product.

As shown in FIG. 3 and as indicated by Expression (1), the smaller the time constant τ is, the faster the resistance voltage decreases. The time constant τ is expressed as Expression (2) below.

$$\tau = (n-k) \cdot q \cdot r \quad (2)$$

(n−k)·q indicates the electrostatic capacitance of a parallel circuit that includes one or more capacitors connected to one or more fuses that are not blown among the n fuses F1, F2, . . . , and Fn. As described above, the resistance value r indicates the resistance value of the circuit resistor 31.

The MICOM 37 determines the time constant τ of the resistance voltage based on a plurality of detected values. The time constant τ that is determined is one of (N·q·r), ((n−1)·q·r), ((n−2)·q·r), . . . , and (q·r). If the determined time constant τ is smaller than (n·q·r), the MICOM 37 determines that there is a blown fuse among the n fuses F1, F2, . . . , and Fn. The MICOM 37 divides the determined time constant by (q·r). Accordingly, the number of fuses that are not blown, that is, (n−k) is calculated. The MICOM 37 calculates the number of blown fuses, that is, the integer k by subtracting the value calculated by dividing the time constant by (q·r) from n.

When all of the n fuses F1, F2, . . . , and Fn are blown, even if the circuit switch 30 is on, a current does not flow through the circuit resistor 31. For this reason, when all of the n fuses F1, F2, . . . , and Fn are blown, the resistance voltage is already 0 V at a time point when the circuit switch 30 is switched on. After that, the resistance voltage is maintained at 0 V. For this reason, the MICOM 37 detects fusing of the n fuses F1, F2, . . . , and Fn, if the detected value is 0 V.

Configuration of MICOM 37

Figure 4:
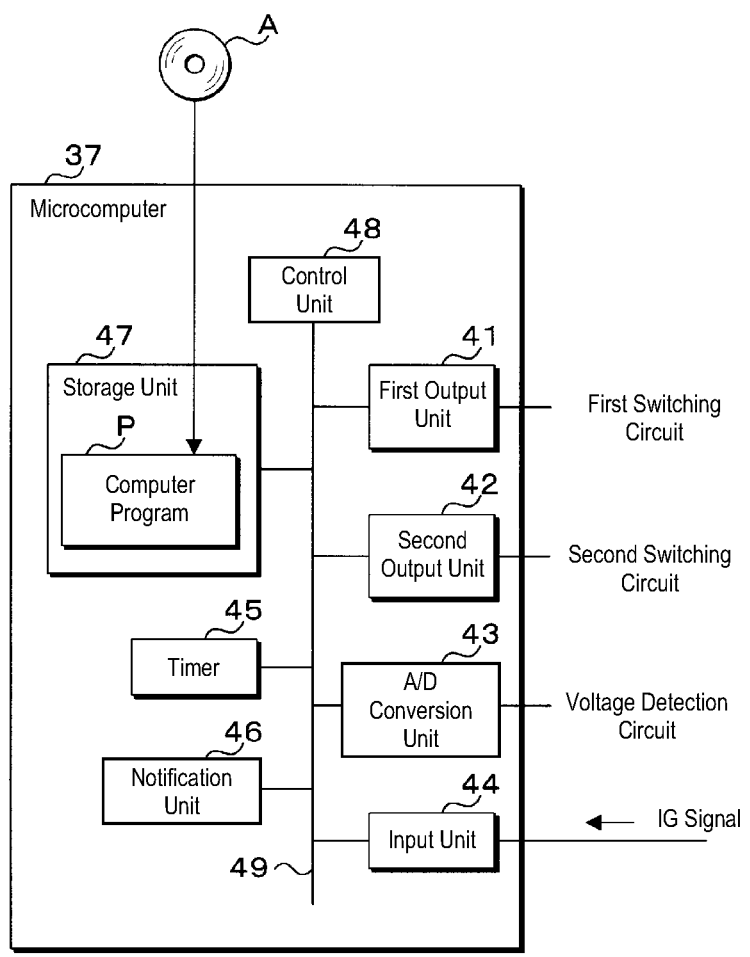
FIG. 4 is a block diagram showing a main configuration of the microcomputer.

FIG. 4 is a block diagram showing a main configuration of the MICOM 37. The MICOM 37 includes a first output unit 41, a second output unit 42, an A/D conversion unit 43, an input unit 44, a timer 45, a notification unit 46, a storage unit 47, and a control unit 48. Each of these units is connected to an internal bus 49. The first output unit 41 is further connected to the first switching circuit 35. The second output unit 42 is further connected to the second switching circuit 36. The A/D conversion unit 43 is further connected to the connection node between the voltage divider resistors Rd1 and Rd2 of the voltage detection circuit 34.

The first output unit 41 outputs a first instruction signal to the first switching circuit 35. The control unit 48 instructs the first output unit 41 to switch the circuit switch 30 on. In this case, the first output unit 41 switches the voltage indicated by the first instruction signal to the high-level voltage. Accordingly, the first switching circuit 35 switches the circuit switch 30 on. The control unit 48 also instructs the first output unit 41 to switch the circuit switch 30 off. In this case, the first output unit 41 switches the voltage indicated by the first instruction signal to the low-level voltage. Accordingly, the first switching circuit 35 switches the circuit switch 30 off.

The second output unit 42 outputs a second instruction signal to the second switching circuit 36. The control unit 48 instructs the second output unit 42 to switch the discharge switch 32 on. In this case, the second output unit 42 switches the voltage indicated by the second instruction signal to the high-level voltage. Accordingly, the second switching circuit 36 switches the discharge switch 32 on. The control unit 48 also instructs the second output unit 42 to switch the discharge switch 32 off. In this case, the second output unit 42 switches the voltage indicated by the second instruction signal to the low-level voltage. Accordingly, the second switching circuit 36 switches the discharge switch 32 off.

Analog detection information indicating a detected value of the resistance voltage is input from the voltage detection circuit 34 to the A/D conversion unit 43. The A/D conversion unit 43 converts the analog detection information input from the voltage detection circuit 34 into digital detection information. The control unit 48 obtains the digital detection information from the A/D conversion unit 43. The detected value indicated by the detection information obtained by the control unit 48 matches a detected value of the resistance voltage detected by the voltage detection circuit 34 when the detected value indicated by the detection information was obtained.

Note that matching of the two detected values does not mean complete matching only. A state where two detected values match each other includes a state where the difference between the two detected values is within an error range.

An IG signal is input to the input unit 44.

The control unit 48 instructs the timer 45 to start measurement. In this case, the timer 45 measures a time that has elapsed since it was instructed to start measurement. The measured time measured by the timer 45 is read out by the control unit 48. The control unit 48 instructs the timer 45 to end measurement. In this case, the timer 45 ends measurement.

The notification unit 46 performs notification in accordance with an instruction from the control unit 48. When there is a blown fuse among the n fuses F1, F2, . . . , and Fn, the notification unit 46 performs notification by outputting a first notification signal indicating the number of blown fuses to an apparatus (not illustrated), for example. When all of the n fuses F1, F2, . . . , and Fn are blown, the notification unit 46 performs notification by outputting a second notification signal indicating that all of the n fuses F1, F2, . . . , and Fn are blown to the apparatus, for example.

The storage unit 47 is a non-volatile memory. A computer program P is stored in the storage unit 47. The control unit 48 includes a processing element for executing processing, such as a CPU (Central Processing Unit). The processing element (computer) of the control unit 48 executes blown fuse detection processing and the like by executing the computer program P. The control unit 48 functions as a processing unit.

The blown fuse detection processing is processing for detecting whether or not there is a blown fuse among the n fuses F1, F2, . . . , and Fn, and whether or not all of the n fuses F1, F2, . . . , and Fn are blown.

Note that the computer program P may also be stored in a storage medium A in a manner readable by the processing element of the control unit 48. In this case, the computer program P read out from the storage medium A by a readout device (not illustrated) is written in the storage unit 47. The storage medium A is an optical disk, a flexible disk, a magnetic disk, a magnetic optical disk, a semiconductor memory, or the like. The optical disk is a CD (compact disk)-ROM (read only memory), a DVD (digital versatile disk)-ROM, a BD (Blu-ray (registered trademark) disk), or the like. The magnetic disk is a hard disk, for example. In addition, the computer program P may also be downloaded from a device (not illustrated) connected to a communication network (not illustrated), and written in the storage unit 47.

The number of processing elements of the control unit 48 is not limited to one, and may be two or more. In this case, a plurality of processing elements may execute blown fuse detection processing and the like in cooperation in accordance with the computer program P.

Blown Fuse Detection Processing

Figure 5:
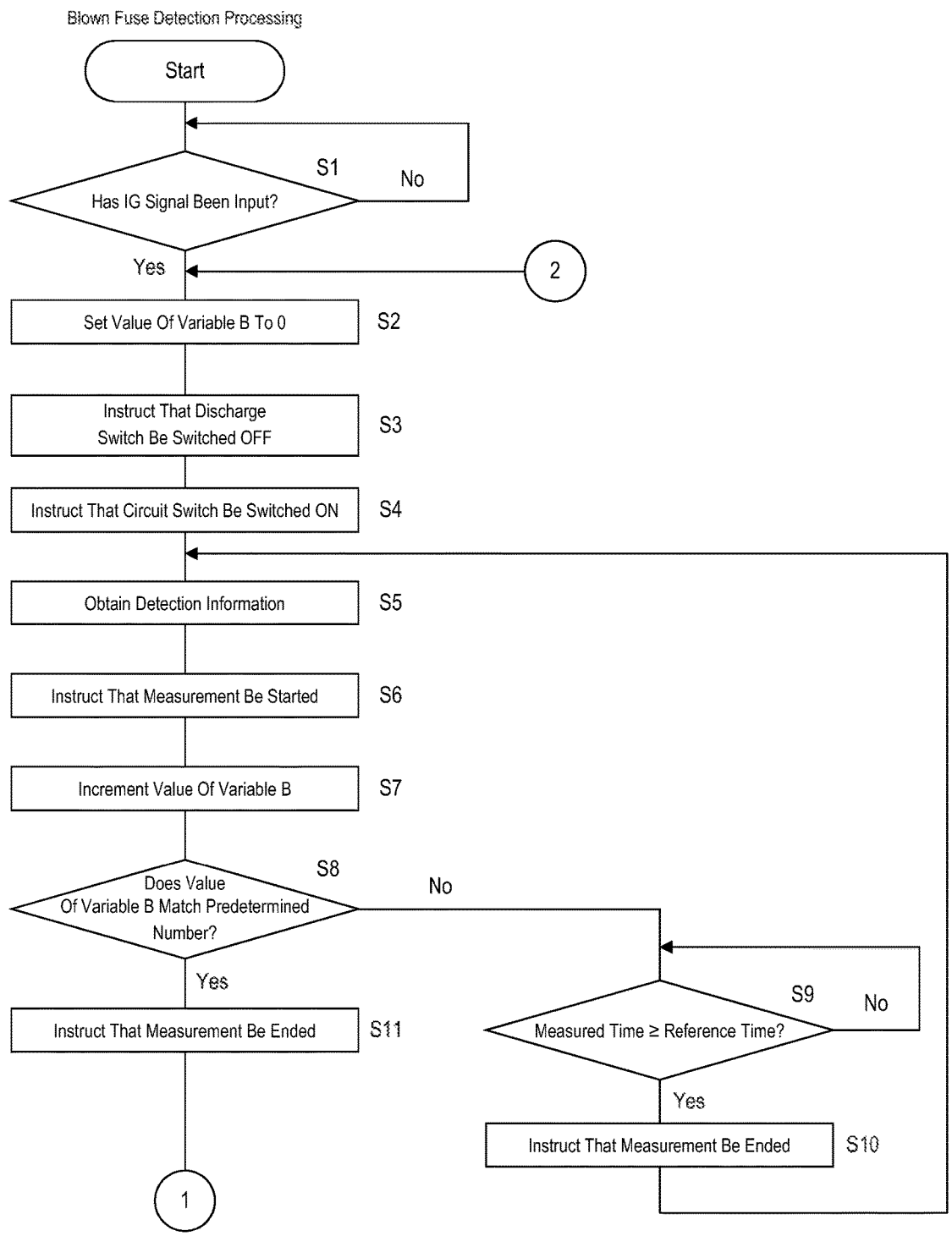
FIG. 5 is a flowchart showing a procedure of blown fuse detection processing.
Figure 6:
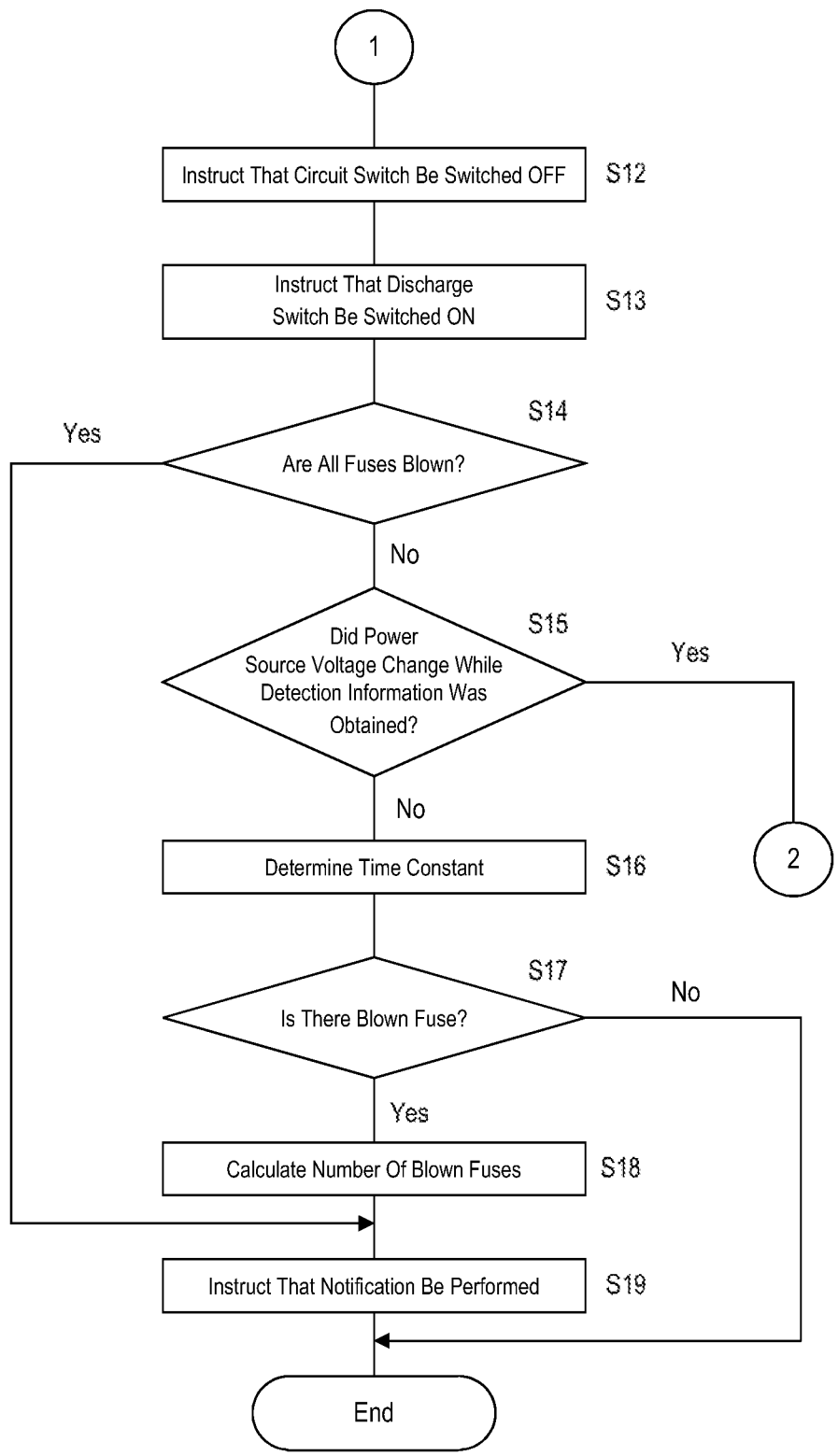
FIG. 6 is a flowchart showing a procedure of blown fuse detection processing.

FIGS. 5 and 6 are flowcharts showing procedures of blown fuse detection processing. The control unit 48 executes the blown fuse detection processing in a state where the circuit switch 30 is off and the discharge switch 32 is on. The storage unit 47 stores the value of a variable B. The value of the variable B indicates the number of times detection information indicating a detected value of the resistance voltage was obtained. The value of the variable B is changed by the control unit 48.

In the blown fuse detection processing, first, the control unit 48 determines whether or not an IG signal has been input to the input unit 44 (step S1). If it is determined that an IG signal has not been input (step S1: NO), the control unit 48 executes step S1 again, and waits until an IG signal is input to the input unit 44. While the control unit 48 is waiting, the n capacitors C1, C2, . . . , and Cn discharge via the discharge resistor 33.

If it is determined that an IG signal has been input (step S1: YES), the control unit 48 sets the value of the variable B to 0 (step S2), and instructs the second output unit 42 to switch the discharge switch 32 off (step S3). Accordingly the voltage indicated by the second instruction signal is switched to the low-level voltage, and the second switching circuit 36 switches the discharge switch 32 off.

Next, the control unit 48 instructs the first output unit 41 to switch the circuit switch 30 on (step S4). Accordingly, the voltage indicated by the first instruction signal is switched to the high-level voltage, and the first switching circuit 35 switches the circuit switch 30 on. As described above, when the circuit switch 30 is on, a resistance voltage that is the voltage between the two ends of the circuit resistor 31 decreases from the power source voltage value of the DC power source 10 with the lapse of time.

Next, the control unit 48 obtains, from the A/D conversion unit 43, detection information indicating a detected value of the resistance voltage in a state where the circuit switch 30 is on (step S5). The detected value indicated by the detection information obtained in step S5 executed immediately after step S4 was executed substantially matches the power source voltage value of the DC power source 10. After executing step S5, the control unit 48 instructs the timer 45 to start measurement (step S6). Accordingly, the timer 45 measures a time that has elapsed since it was instructed to start measurement.

Next, the control unit 48 increments the value of the variable B by 1 (step S7), and determines whether or not the value of the variable B matches a predetermined number (step S8). The predetermined number is an integer of 2 or more. The predetermined number is a fixed value, and is set in advance. The predetermined number is stored in the storage unit 47, for example. If it is determined that the value of the variable B does not match the predetermined number (step S8: NO), the control unit 48 determines whether or not a measurement time measured by the timer 45 is longer than or equal to a reference time (step S9). The reference time is a fixed value, and is set in advance. The reference time is stored in the storage unit 47, for example.

If it is determined that the measured time is shorter than the reference time (step S9: NO), the control unit 48 executes step S9 again, and waits until the measured time reaches the reference time. If it is determined that the measured time is longer than or equal to the reference time (step S9: YES), the control unit 48 instructs the timer 45 to end measurement (step S10). Accordingly the timer 45 ends time measurement. After executing step S10, the control unit 48 executes step S5 again, and obtains detection information.

As described above, until the value of the variable B matches the predetermined number, the control unit 48 obtains detection information every time the reference time elapses, in a state where the circuit switch 30 is on. The reference time is 5 [ms], for example. The predetermined number is preferably three or more.

If it is determined that the value of the variable B matches the predetermined number (step S8: YES), the control unit 48 instructs the timer 45 to end measurement (step S11). Accordingly, the timer 45 ends time measurement. Next, the control unit 48 instructs the first output unit 41 to switch the circuit switch 30 off (step S12). Accordingly the voltage indicated by the first instruction signal is switched to the low-level voltage, and the first switching circuit 35 switches the circuit switch 30 off Flow of a current through the circuit resistor 31 stops.

Next, the control unit 48 instructs the second output unit 42 to switch the discharge switch 32 on (step S13). Accordingly the voltage indicated by the second instruction signal is switched to the high-level voltage, and the second switching circuit 36 switches the discharge switch 32 on. When the discharge switch 32 is switched on, as described above, the n capacitors C1, C2, . . . , and Cn discharge via the discharge resistor 33.

After executing step S13, the control unit 48 determines whether or not all of the fuses, that is, the n fuses F1, F2, . . . , and Fn are blown, based on a plurality of detected values indicated by a plurality of pieces of obtained detection information (step S14). In step S14, the control unit 48 determines whether or not all of the fuses are blown, based on whether or not the detected values indicated by the obtained detection information are 0. In a first example of step S14, if all of a plurality of detected values are 0 V the control unit 48 determines that all of the fuses are blown. In a second example of step S14, if the detected value of the resistance voltage detected first since step S4 was executed is 0 V the control unit 48 determines that all of the fuses are blown.

If it is determined that all of the fuses are not blown (step S14: NO), the control unit 48 determines whether or not the power source voltage of the DC power source 10 changed while the plurality of pieces of detection information were obtained (step S15). If the power source voltage of the DC power source 10 changed while the plurality of pieces of detection information were obtained, the control unit 48 cannot obtain appropriate detection information, that is, appropriate detected values. For this reason, step S15 is executed. A period during which a plurality of pieces of detection information are obtained is, for example, a period from when step S4 is executed until when step S11 is executed.

When the power source voltage increases, the difference between two detected values indicated by two pieces of detection information obtained consecutively is small. For this reason, a method for determining whether or not the difference between two detected values indicated by two pieces of detection information obtained consecutively is smaller than a first threshold may be adopted as a first method for detecting an increase in the power source voltage. The first threshold is a fixed value, and is set in advance. When the electricity generator 20 generates electricity, or a large current load to which a large current is supplied stops operating, the power source voltage increases. For this reason, for example, a method for determining, based on a state signal indicating the operation state of the electricity generator 20 or the large current load, whether or not the electricity generator 20 or the large current load has been activated may be adopted as a second method for detecting an increase in the power source voltage. As described above, the large current load is one of the n loads U1, U2, . . . , and Un.

When the power source voltage decreases, the difference between two detected values indicated by two pieces of detection information obtained consecutively is large. For this reason, a method for determining whether or not the difference between two detected values indicated by two pieces of detection information obtained consecutively is larger than or equal to a second threshold may be adopted as a first method for detecting a decrease in the power source voltage. The second threshold is a fixed value, and is set in advance. The second threshold is larger than or equal to the first threshold. When the electricity generator 20 stops generating electricity, or the large current load is activated, the power source voltage decreases. For this reason, for example, a method for determining, based on the aforementioned state signals, whether or not the electricity generator 20 or the large current load has stopped operating may be adopted as a second method for detecting a decrease in the power source voltage.

If it is determined that the power source voltage changed (step S15: YES), the control unit 48 executes step S2, and obtains a plurality of pieces of detection information again. If it is determined that the power source voltage did not change (step S15: NO), the control unit 48 determines a time constant of the resistance voltage, based on the plurality of detected values indicated by the plurality of pieces of obtained detection information (step S16). In a first example of step S16, (n−1) graphs in which the time constants are (n·q·r), ((n−1)·q·r), ((n−2)·q·r), . . . , and (q·r) are plotted using, as a power source voltage, the detected value indicated by the detection information obtained in step S5 that is executed immediately after step S4 is executed. Here, each graph indicates a change in the resistance voltage. From the (n−1) graphs, one graph that lies in the vicinity of a plurality of detected values detected at a reference time interval is selected. The control unit 48 determines a time constant as a time constant of the selected graph.

In a second example of step S16, a simultaneous equation is created by respectively substituting, for the resistance voltage value Vr and the time t in Expression (1), a plurality of detected values and a plurality of periods from when an instruction to switch the circuit switch 30 on was given until when a detection information value is obtained. The time constant τ is calculated by solving the created simultaneous equation. A value that is closest to the calculated time constant among (n·q·r), ((n−1)·q·r), ((n−2)·q·r), . . . , and (q·r) is then determined as the time constant of the resistance voltage.

Next, the control unit 48 determines, based on the time constant determined in step S16, whether or not there is a blown fuse among the n fuses F1, F2, . . . , and Fn (step S17). In step S17, if the time constant determined in step S16 is (n·q·r), the control unit 48 determines that there is no blown fuse. If the time constant determined in step S16 is smaller than (n·q·r), the control unit 48 detects that there is a blown fuse. Here, (n·q·r) is the time constant of the resistance voltage in a case where the n fuses F1, F2, . . . , and Fn are not blown.

Note that executing step S17 is equivalent to detecting whether or not there is a blown fuse among the n fuses F1, F2, . . . , and Fn.

If it is determined that there is a blown fuse (step S17: YES), the control unit 48 calculates the number of blown fuses among the n fuses F1, F2, . . . , and Fn (step S18). It is possible to calculate the number of fuses that are not blown, that is, (n−k) by dividing the time constant determined in step S16 by (q·r). The number of blown fuses, that is, the integer k is calculated by subtracting the calculated number from n.

If it is determined that all of the fuses are blown (step S14: YES), or, after executing step S18, the control unit 48 instructs the notification unit 46 to perform notification (step S19). In step S19 that is executed after step S18 is executed, the control unit 48 causes the notification unit 46 to output a first notification signal indicating the number calculated in step S18 to an apparatus (not illustrated), for example. In step S19 that is executed if the control unit 48 determines that all of the fuses are blown, the control unit 48 causes the notification unit 46 to output a second notification signal indicating fusing of all of the fuses to the apparatus, for example.

If it is determined that there is no blown fuse (step S17: NO), or after executing step S19, the control unit 48 ends the blown fuse detection processing. After ending the blown fuse detection processing, the control unit 48 executes step S1 of the blown fuse detection processing again, and waits until an IG signal is input.

In the blown fuse detection apparatus 11 configured as described above, when the circuit switch 30 is switched on, the resistance voltage decreases. The smaller the time constant of the resistance voltage is, the faster the resistance voltage decreases. The time constant changes in accordance with the number of blown fuses among the n fuses F1, F2, . . . , and Fn. For this reason, the control unit 48 can appropriately detect whether or not there is a blown fuse among the n fuses F1, F2, . . . , and Fn, based on a detected value of the resistance voltage.

Second Embodiment

In the blown fuse detection processing according to the first embodiment, the control unit 48 of the MICOM 37 determines a time constant of the resistance voltage based on a plurality of detected values. A learned model that has been trained on the relation between a time constant of the resistance voltage and a plurality of detected values of the resistance voltage may be used for determining a time constant.

Differences from the first embodiment will be described below as a second embodiment. Configurations other than those to be described later are common to the first embodiment. For this reason, the same reference signs as the first embodiment are given to constituent elements common to the first embodiment, and a description of those constituent elements is omitted.

Configuration of MICOM 37

Figure 7:
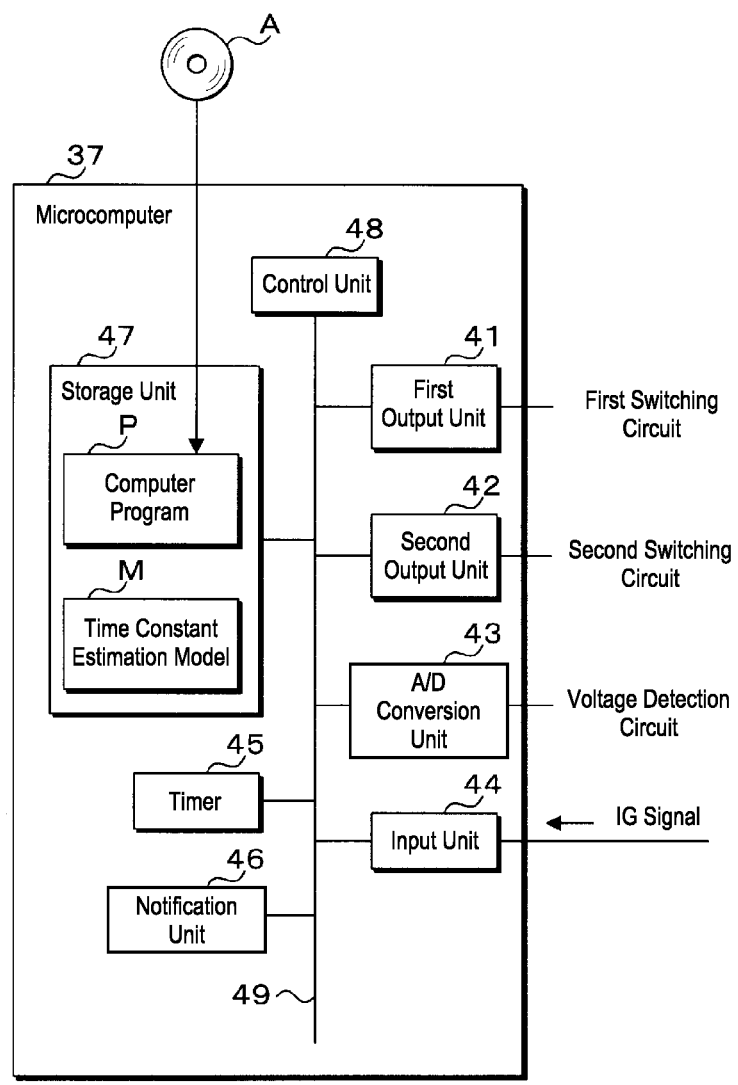
FIG. 7 is a block diagram showing a main configuration of a microcomputer according to a second embodiment.

FIG. 7 is a block diagram showing the configuration of the MICOM 37 according to the second embodiment. The MICOM 37 according to the second embodiment includes the constituent elements of the MICOM 37 according to the first embodiment in a similar manner. Furthermore, the storage unit 47 of the MICOM 37 stores a time constant estimation model M (learned model) that has been trained on the relation between a time constant of the resistance voltage and a plurality of detected values of the resistance voltage.

Description of Time Constant Estimation Model M

Figure 8:
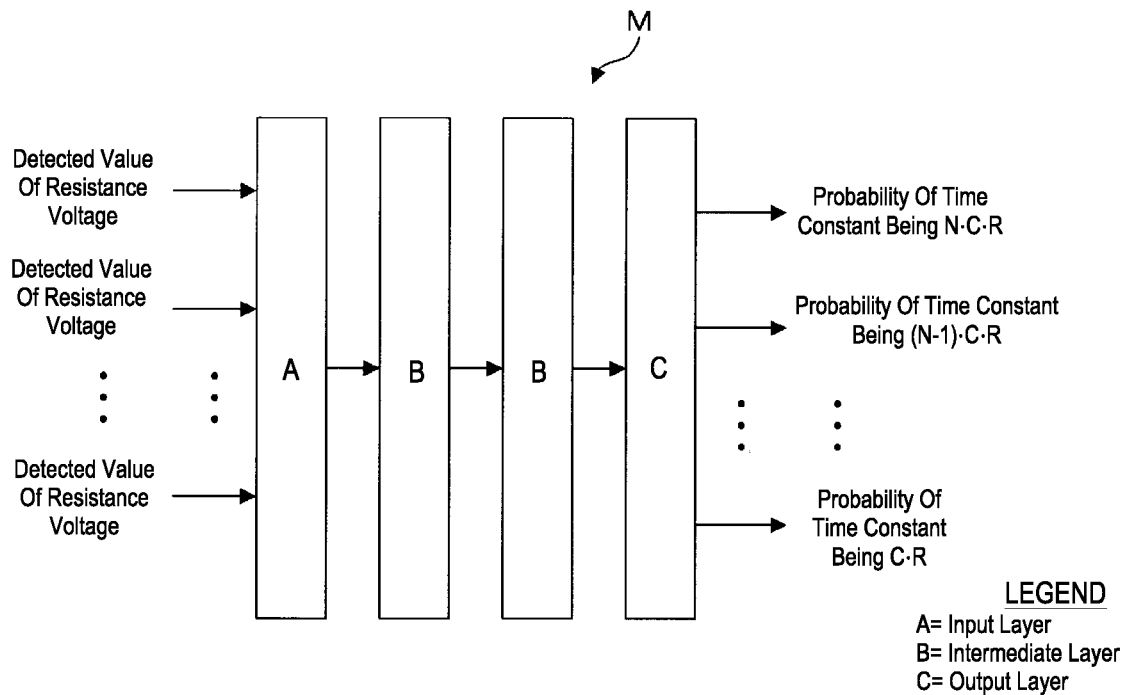
FIG. 8 is a diagram illustrating a time constant estimation model.

FIG. 8 is a diagram illustrating the time constant estimation model M. The time constant estimation model M is a learning model of machine learning that includes deep learning, for example, and is constituted by a neural network. The time constant estimation model M includes an input layer, two intermediate layers, and an output layer. In the example in FIG. 8, two intermediate layers are depicted. However, the number of intermediate layers is not limited to two, and may be three or greater.

Each of the input layer, the intermediate layers, and the output layer includes one or more nodes. Anode of each layer is bonded to a node of both or one of adjacent layers in one direction due to a desired weight and bias. The number of nodes in the input layer of the time constant estimation model M matches the number of pieces of data that is input to the input layer. In the blown fuse detection apparatus 11 according to the second embodiment, data that is input to a node of the input layer is a detected value of the resistance voltage indicated by detection information obtained by the control unit 48.

Data input to the input layer is output to a node of the first intermediate layer through a node constituting the input layer. The data input to the first intermediate layer is output to a node of the next intermediate layer through a node constituting this first intermediate layer. At this time, output is calculated using an activation function that includes the weight and bias that are set between the nodes. From that point on, in a similar manner, computation that uses an activation function including a weight and a bias that are set between nodes is executed, and computation results are transmitted to subsequent layers one after another until a computation result of the output layer is obtained. Here, input/output and computation of data are executed by the processing element of the control unit 48.

The output layer outputs the computation result related to the time constant of the resistance voltage. Specifically, a probability of the time constant being $n \cdot c \cdot r$, a probability of the time constant being $(n-1) \cdot c \cdot r$, and the like are output. Probabilities respectively corresponding to $n \cdot c \cdot r$, $(n-1) \cdot c \cdot r$, . . . , and $c \cdot r$ are output.

Regarding the time constant estimation model M, a predetermined learning algorithm is trained on parameters such as weights and biases for bonding nodes. A learning algorithm for deep learning that includes backpropagation, for example, is used as the learning algorithm that is trained on various parameters. Training data indicating a plurality of detected values of the resistance voltage and one time constant corresponding to these detected values is collected, and training is performed using the collected training data.

Specifically, a plurality of detected values indicated by the training data are input to the input layer of the time constant estimation model M. Accordingly, a result output from the output layer is evaluated. The predetermined learning algorithm is then trained on various parameters that include weights and biases between nodes such that the output result of the output layer is a result corresponding to the time constant indicated by the training data. The result corresponding to the time constant indicated by the training data means that a probability of the output result corresponding to the time constant indicated by the training data is highest, for example.

Note that the time constant estimation model M may be generated inside the blown fuse detection apparatus 11, or may be generated by an apparatus different from the blown fuse detection apparatus 11.

Processing for Determining Time Constant

Figure 9:
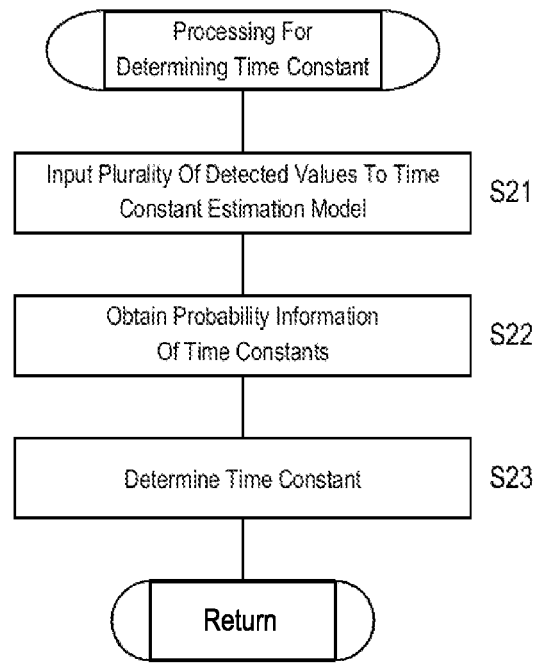
FIG. 9 is a flowchart showing a procedure of processing for determining a time constant.

FIG. 9 is a flowchart showing a procedure of processing for determining a time constant. In the blown fuse detection processing according to the second embodiment, in step S16, the control unit 48 executes time constant determination processing. In the time constant determination processing, the control unit 48 first inputs, to the time constant estimation model M, a plurality of detected values indicated by a plurality of pieces of detection information obtained by repeatedly executing step S5 of the blown fuse detection processing (step S21). Accordingly, computation is performed in the time constant estimation model M, and probability information indicating a plurality of probabilities corresponding to (n·q·r), ((n−1)·q·r), ..., and (q·r) is output from the output layer. As described above, computation in the time constant estimation model M is executed by the control unit 48.

After executing step S21, the control unit 48 obtains probability information of time constants output from the output layer of the time constant estimation model M (step S22). Next, the control unit 48 determines, as a time constant of the resistance voltage, a time constant corresponding to the highest probability among (n−1) probabilities indicated by the probability information obtained in step S22, for example (step S23). After executing step S23, the control unit 48 executes step S17 of the blown fuse detection processing. In steps S17 and S18 of the blown fuse detection processing, the time constant determined in step S23 of the time constant determination processing is used.

Data indicating the plurality of detected values input to the time constant estimation model M in step S21 and the time constant determined in step S23 may be used as the above training data. Accordingly, retraining of the time constant estimation model M can be performed.

Effects and Explanatory Notes

The blown fuse detection apparatus 11 according to the second embodiment achieves the same effects as the blown fuse detection apparatus 11 according to the first embodiment.

Note that data that is input to the time constant estimation model M is not limited to detected values indicated by detection information, and detection information itself, that is, a value obtained by the voltage divider resistors Rd1 and Rd2 of the voltage detection circuit 34 performing voltage division may be input. In this case, the time constant estimation model M is a learned model that has been trained on the relation between the time constant of the resistance voltage and a plurality of voltage divider values related to the resistance voltage. In addition, the time constant estimation model M may be configured to output one time constant instead of a plurality of probabilities.

Third Embodiment

In the first embodiment, the control unit 48 of the MICOM 37 determines a time constant, and detects whether or not there is a blown fuse among the n fuses F1, F2, ..., and Fn based on the determined time constant. However, a value that is used for the blown fuse detection method for detecting whether or not there is a blown fuse is not limited to a time constant.

Differences from the first embodiment will be described below as a third embodiment. Configurations other than those to be described later are common to the first embodiment. For this reason, the same reference signs as the first embodiment are given to constituent elements common to the first embodiment, and a description of those constituent elements is omitted.

Overview of Blown Fuse Detection Method

Figures 10, 11:
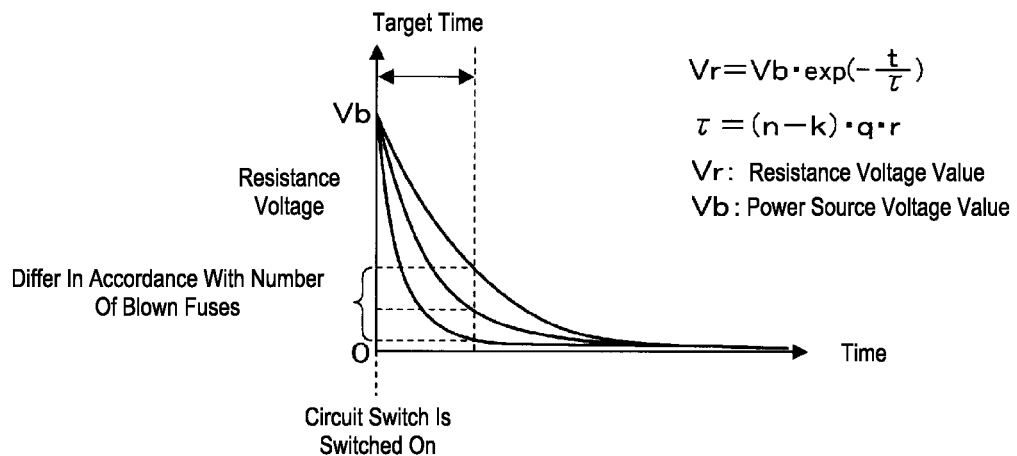
FIG. 10 is a diagram illustrating an overview of a blown fuse detection method according to a third embodiment.
FIG. 11 is a diagram showing the content of a resistance voltage table.

FIG. 10 is a diagram illustrating an overview of a blown fuse detection method according to the third embodiment. FIG. 10 shows a change in the resistance voltage shown in the lower part of FIG. 3. As mentioned in description of the first embodiment, the larger the number of blown fuses is, the smaller the time constant becomes. The smaller the time constant is, the faster the resistance voltage decreases.

Therefore, when the power source voltage value Vb of the DC power source 10 is fixed, the resistance voltage value at a time point when a certain target time has elapsed since the circuit switch 30 was switched on changes in accordance with the time constant, that is, the number of blown fuses.

In the blown fuse detection processing according to the first embodiment, the control unit 48 of the MICOM 37 detects whether or not there is a blown fuse based on a detected value of the resistance voltage detected at a time point when a target time has elapsed since the control unit 48 instructed that the circuit switch 30 be switched on.

Configuration of MICOM 37

The storage unit 47 of the MICOM 37 according to the third embodiment stores a resistance voltage table indicating a resistance voltage value at a time point when a target time has elapsed since the circuit switch 30 was switched on.

FIG. 11 is a diagram showing the resistance voltage table. The resistance voltage table indicates a plurality of resistance voltage values corresponding to power source voltage values of the DC power source 10 and numbers of blown fuses. In the example in FIG. 11, 14.0 V 13.9 V 13.8 V, 12.0 V and the like are used as the power source voltage values. 0, 1, ..., and (n−1) are used as the numbers of blown fuses. The resistance voltage values indicated by the resistance voltage table are values obtained by performing actual measurement, simulation, or the like.

Blown Fuse Detection Processing

Figure 12:
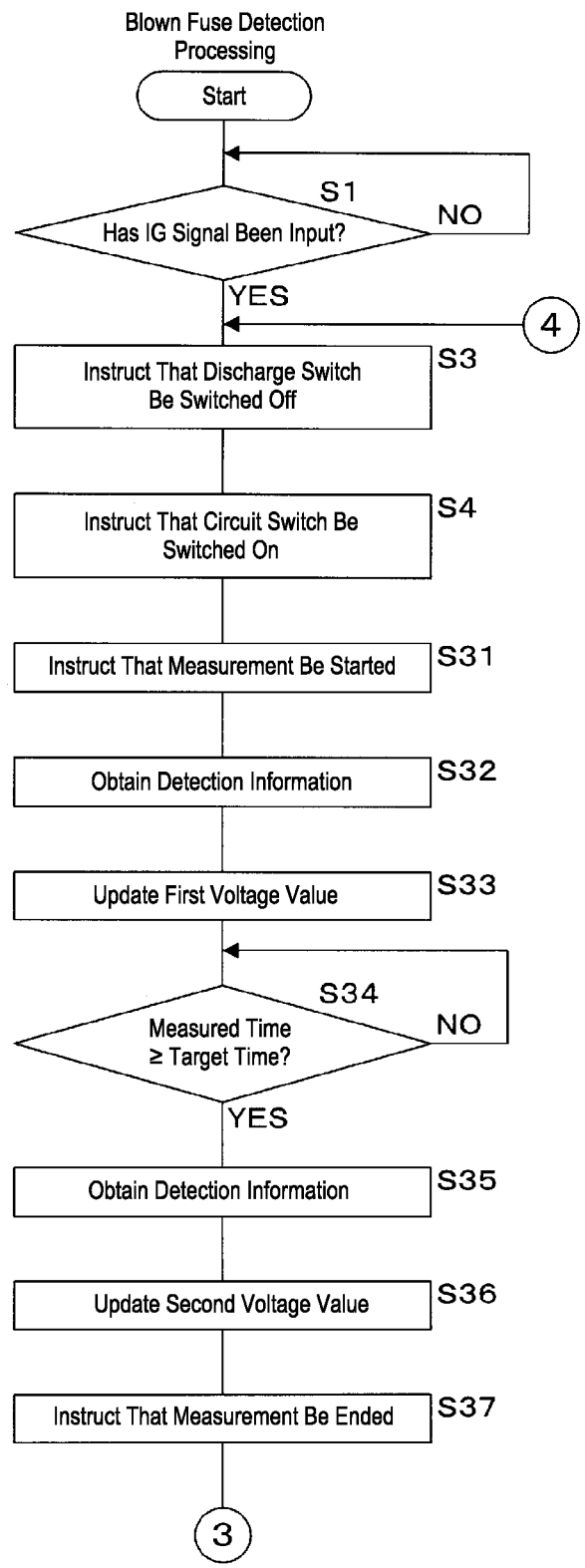
FIG. 12 is a flowchart showing a procedure of blown fuse detection processing.
Figure 13:
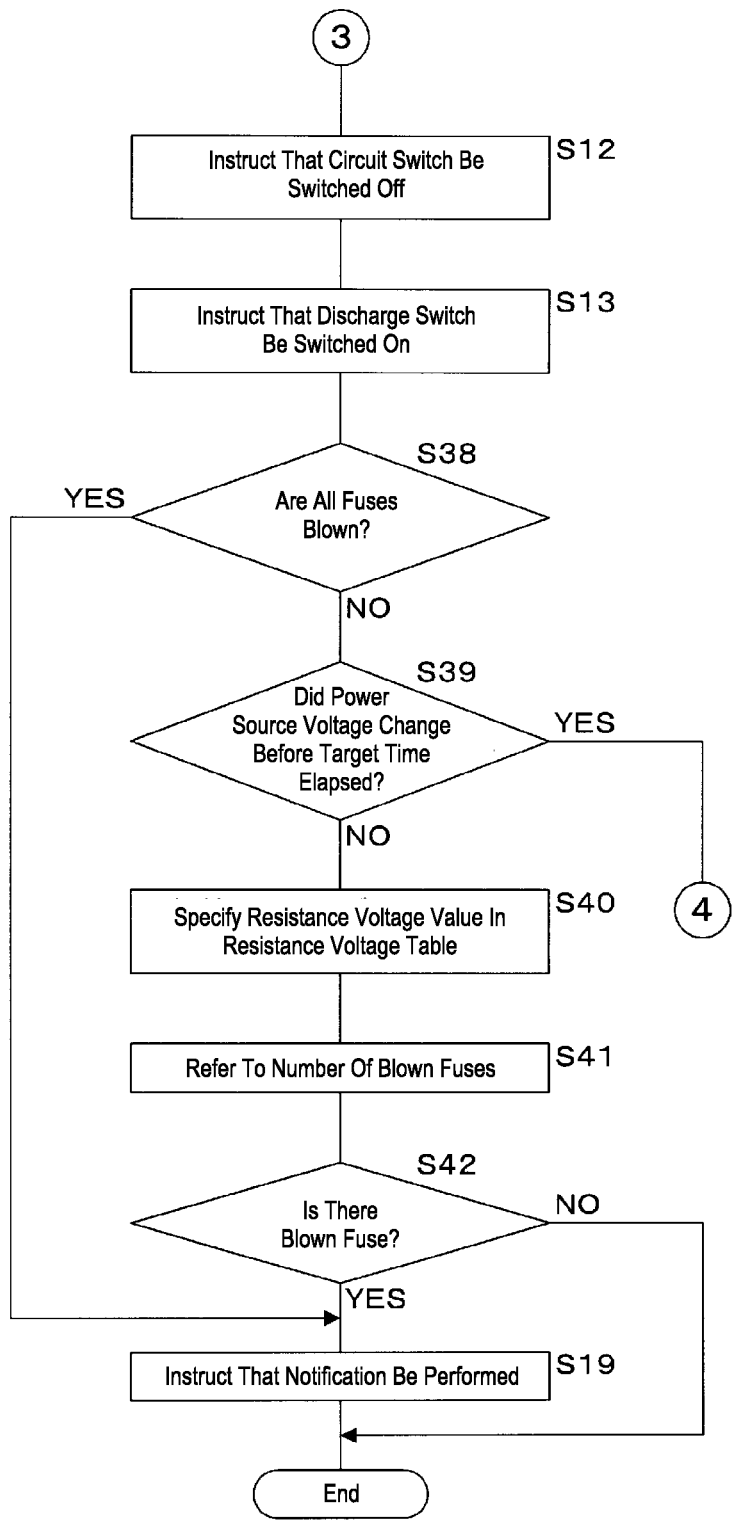
FIG. 13 is a flowchart showing a procedure of blown fuse detection processing.

FIGS. 12 and 13 are flowcharts showing a procedure of blown fuse detection processing. The control unit 48 executes the blown fuse detection processing in a state where the circuit switch 30 is off and the discharge switch 32 is on, similarly to the first embodiment. A portion of the blown fuse detection processing according to the third embodiment is common to a portion of the blown fuse detection processing according to the first embodiment. For this reason, in the blown fuse detection processing according to the third embodiment, similar numerals to the first embodiment are given to steps common to those in the blown fuse detection processing according to the first embodiment, and a detailed description of processing of these steps is omitted. Specifically, detailed description of steps S1, S3, S4, S12, S13, and S19 is omitted.

The storage unit 47 of the MICOM 37 stores a first voltage value and a second voltage value. The first voltage value is handled as a power source voltage value of the DC power source 10. The second voltage value is handled as a resistance voltage value at a time point when a target time has elapsed since the circuit switch 30 was switched on. The first voltage value and the second voltage value are updated by the control unit 48.

In the blown fuse detection processing, if it is determined that an IG signal has been input to the input unit 44 (step S1: YES), the control unit 48 executes step S3. As a result of the control unit 48 executing steps S3 and S4, the circuit switch 30 is switched on and the discharge switch 32 is switched off. As described above, in a state where the circuit switch 30 is on, the resistance voltage decreases from the power source voltage value of the DC power source 10 with the lapse of time.

After executing step S4, the control unit 48 instructs the timer 45 to start measurement (step S31). Accordingly, the timer 45 measures a time that has elapsed from a time point when the instruction to start measurement was given, that is, a time point when the circuit switch 30 was switched on. After executing step S31, the control unit 48 obtains, from the A/D conversion unit 43, detection information indicating a detected value of the resistance voltage (step S32). This detected value is a resistance voltage value detected immediately after the circuit switch 30 was switched on, and substantially matches the power source voltage value of the DC power source 10. Executing step S32 is equivalent to obtaining the power source voltage value of the DC power source 10.

Next, the control unit 48 updates the first voltage value to the detected value indicated by the detection information obtained in step S32 (step S33). After executing step S33, the control unit 48 determines whether or not the measurement time measured by the timer 45 is longer than or equal to a target time (step S34). If it is determined that the measurement time is shorter than the target time (step S34: NO), the control unit 48 executes step S34 again, and waits until the measurement time reaches the target time. If it is determined that the measurement time is longer than or equal to the target time (step S34: YES), the control unit 48 obtains detection information from the A/D conversion unit 43 (step S35). The detected value indicated by the detection information obtained in step S35 is the detected value of the resistance voltage at a time point when the target time has elapsed since the circuit switch 30 was switched on. The target time corresponds to the predetermined time. Next, the control unit 48 updates the second voltage value to the detected value of the resistance voltage indicated by the detection information obtained in step S35 (step S36).

After executing step S36, the control unit 48 instructs the timer 45 to end measurement (step S37). Accordingly the timer 45 ends time measurement. After executing step S37, the control unit 48 sequentially executes steps S12 and S13. Accordingly, the circuit switch 30 is switched off and the discharge switch 32 is switched on. As mentioned in description of the first embodiment, when the circuit switch 30 is switched off, flow of a current through the circuit resistor 31 stops. When the discharge switch 32 is on, the n capacitors C1, C2, . . . , and Cn discharge via the discharge resistor 33.

After executing step S13, the control unit 48 determines whether or not all of the fuses, that is, the n fuses F1, F2, . . . , and Fn are blown, based on the first voltage value, that is, the detected value indicated by the detection information obtained in step S32 (step S38). In step S38, the control unit 48 determines whether or not all of the fuses are blown, based on whether or not the first voltage value is 0. As described above, the first voltage value is a resistance voltage value detected immediately after the circuit switch 30 was switched on. If the first voltage value is 0 V the control unit 48 determines that all of the fuses are blown. If the first voltage value is not 0 V the control unit 48 determines that all of the fuses are not blown.

If it is determined that all of the fuses are not blown (step S38: NO), the control unit 48 determines whether or not the power source voltage of the DC power source 10 changed during a period from when the timer 45 started measurement until when the target time elapsed (step S39). In a case where the power source voltage of the DC power source 10 changed during a period from when the circuit switch 30 was switched on until when the target time elapsed, the control unit 48 cannot obtain appropriate detection information, that is, an appropriate detected value. For this reason, step S39 is executed.

When the power source voltage increases, the difference between the first voltage value and the second voltage value is small. For this reason, a method for determining whether or not the difference between the first voltage value and the second voltage value is smaller than a first threshold may be adopted as a first method for detecting an increase in the power source voltage. As mentioned in the description of the first embodiment, the first threshold is a fixed value, and is set in advance. When the electricity generator 20 generates electricity, or a large current load to which a large current is supplied stops operating, the power source voltage increases. For this reason, for example, a method for determining whether or not the electricity generator 20 or the large current load has been activated, based on a state signal indicating the operation state of the electricity generator 20 or the large current load is adopted as a second method for detecting an increase in the power source voltage. As mentioned in the description of the first embodiment, the large current load is one of the n loads U1, U2, . . . , and Un.

When the power source voltage decreases, the difference between the first voltage value and the second voltage value is large. For this reason, a method for determining whether or not the difference between the first voltage value and the second voltage value is larger than or equal to a second threshold may be adopted as a first method for detecting a decrease in the power source voltage. As mentioned in the description of the first embodiment, the second threshold is a fixed value, and is set in advance. The second threshold is larger than or equal to the first threshold. When the electricity generator 20 stops generating electricity, or the large current load is activated, the power source voltage decreases. For this reason, for example, a method for determining, based on the aforementioned state signal, whether or not the electricity generator 20 or the large current load has stopped operating is adopted as a second method for detecting a decrease in the power source voltage.

If it is determined that the power source voltage changed (step S39: YES), the control unit 48 executes step S3, and updates the first voltage value and the second voltage value again. If it is determined that the power source voltage did not change (step S39: NO), the control unit 48 specifies a resistance voltage value that is closest to the second voltage value among n resistance voltage values corresponding to power source voltage values that are closest to the first voltage value, in the resistance voltage table (step S40). Next, the control unit 48 refers to the number of blown fuses in the resistance voltage table (step S41). The number of fuses that the control unit 48 refers to in step S41 is the number of fuses corresponding to the resistance voltage value specified in step S40.

Next, the control unit 48 determines whether or not there is a blown fuse among the n fuses F1, F2, . . . , and Fn, based on the number of fuses referred to in step S41 (step S42). In step S42, if the number of fuses referred to in step S41 is not 0, the control unit 48 detects that there is a blown fuse. If the number of fuses referred to in step S41 is 0, the control unit 48 determines that there is no blown fuse.

Note that executing step S42 is equivalent to detecting whether or not there is a blown fuse among the n fuses F1, F2, . . . , and Fn.

As mentioned in the description of the first embodiment, the larger the number of blown fuses is, the lower the time constant of the resistance voltage becomes and the faster the resistance voltage decreases. Therefore, in the resistance voltage table shown in FIG. 11, when the power source voltage value is fixed, the larger the number of blown fuses is, the lower the resistance voltage value becomes. For this reason, the number of fuses referred to in step S41 not being 0 means that the second voltage value is lower than a resistance voltage value when the number of blown fuses is 0.

If it is determined that all of the fuses are blown (step S38: YES), or if it is determined that there is a blown fuse (step S42: YES), the control unit 48 executes step S19. In step S19 that is executed if the control unit 48 determines that there is a blown fuse, the control unit 48 causes the notification unit 46 to output a first notification signal indicating the number of fuses referred to in step S41, to an apparatus, for example. In step S19 that is executed when the control unit 48 determines that all of the fuses are blown, the control unit 48 causes the notification unit 46 to output a second notification signal indicating that all of the fuses are blown, for example.

If it is determined that there is no blown fuse (step S42: NO), or after executing step S19, the control unit 48 ends the blown fuse detection processing. After ending the blown fuse detection processing, the control unit 48 executes step S1 of the blown fuse detection processing again, and waits until an IG signal is input.

The blown fuse detection apparatus 11 according to the third embodiment achieves the same effects as the blown fuse detection apparatus 11 according to the first embodiment.

Fourth Embodiment

In the first embodiment, the n diodes D1, D2, ..., and Dn are used in the discharge circuit for the n capacitors C1, C2, ..., and Cn to discharge. However, the configuration of the discharge circuit is not limited to the configuration that uses the n diodes D1, D2, ..., and Dn.

Differences from the first embodiment will be described below as the fourth embodiment. Configurations other than those to be described later are common to the first embodiment. For this reason, the same reference signs as the first embodiment are given to constituent elements common to the first embodiment, and a description of those constituent elements is omitted.

Configuration of Power Supply System 1

Figure 14:
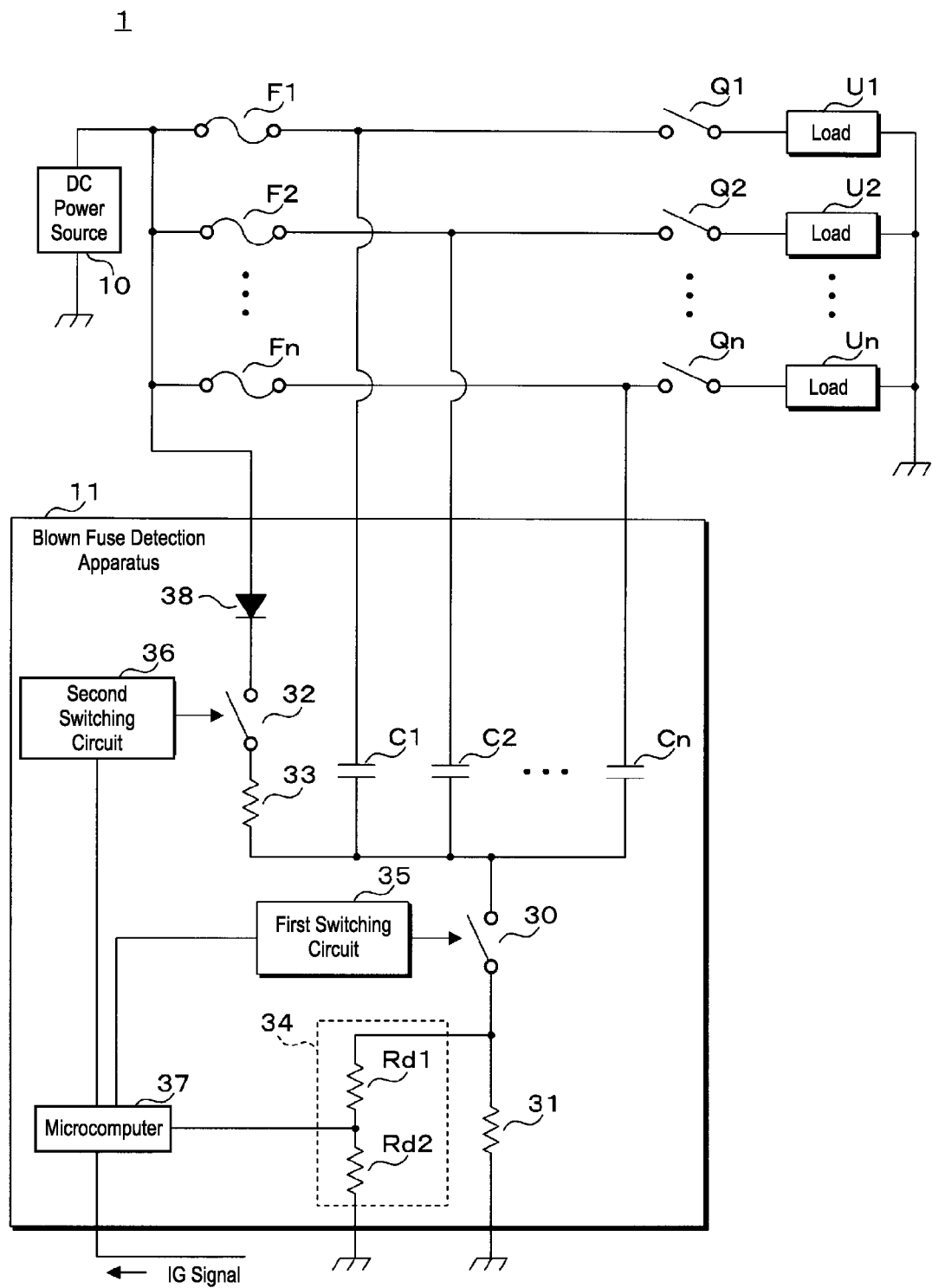
FIG. 14 is a block diagram showing a main configuration of a power source system according to a fourth embodiment.

FIG. 14 is a block diagram showing a main configuration of the power source system 1 according to the fourth embodiment. In the fourth embodiment, the blown fuse detection apparatus 11 is connected to the one end on the downstream side of each of the n fuses F1, F2, ..., and Fn similarly the first embodiment. The blown fuse detection apparatus 11 is also connected to one end of the DC power source 10.

Configuration of Blown Fuse Detection Apparatus 11

The blown fuse detection apparatus 11 according to the fourth embodiment includes the constituent elements other than the n diodes D1, D2, ..., and Dn, among the constituent elements of the blown fuse detection apparatus 11 according to the first embodiment. Connection between the constituent elements other than the n diodes D1, D2, ..., and Dn is similar to that in the first embodiment, except for one end of the discharge switch 32. The blown fuse detection apparatus 11 according to the fourth embodiment includes a diode 38 in place of the n diodes D1, D2, ..., and Dn.

The anode of the diode 38 is connected to one end of the DC power source 10. The cathode of the DC power source 10 is connected to one end of the discharge switch 32.

The first switching circuit 35 and the second switching circuit 36 function in a similar manner to the first embodiment. Therefore, the second switching circuit 36 switches the discharge switch 32 on in a state where the circuit switch 30 is off. When electricity is stored in the capacitor Ci in a state where the circuit switch 30 is off and the discharge switch 32 is on, a current flows from one end of the capacitor Ci through the fuse Fi, the diode 38, the discharge switch 32, the discharge resistor 33, and the other end of the capacitor Ci in the stated order, and the capacitor Ci discharges.

Therefore, when the discharge switch 32 is switched on in a state where the n capacitors C1, C2, ..., and Cn store electricity a current is output from the cathode of the diode 38. The current output from the cathode of the diode 38 flows through the discharge switch 32 and the discharge resistor 33.

Effects and Explanatory Notes

The blown fuse detection apparatus 11 according to the fourth embodiment achieves the same effects as the blown fuse detection apparatus 11 according to the first embodiment.

Note that the configuration of the discharge circuit of the blown fuse detection apparatus 11 according to the second and third embodiments is not limited to the configuration that uses the n diodes D1, D2, ..., and Dn. The blown fuse detection apparatus 11 according to the second and third embodiments may be configured similarly to the blown fuse detection apparatus 11 according to the fourth embodiment.

Modified Examples

In the blown fuse detection processing according to the first to fourth embodiments, the timing when step S2 is executed, that is, the timing when whether or not there is a blown fuse is detected is not limited to a timing when an IG signal is input to the input unit 44. Step S2 may also be executed at a timing when a detection instruction signal instructing that detection be performed is input to the input unit 44, for example. The detection instruction signal is output from an apparatus that is operated by the vehicle dealer, for example.

In the first to fourth embodiments, the blown fuse detection apparatus 11 may further include a power supply detection circuit that detects the power source voltage of the DC power source 10. In this case, the voltage value detected by the power supply detection circuit is used as a power source voltage value.

The discharge circuit according to the first to fourth embodiments may also be a circuit in which a parallel circuit that includes the discharge switch 32 connected to the discharge resistor 33 in series is connected between the two ends of each of the n capacitors C1, C2, ..., and Cn. In this case, when the n discharge switches 32 are switched on, the n capacitors C1, C2, ..., and Cn discharge.

In the first to fourth embodiments, each of the electrostatic capacitances of the n capacitors C1, C2, ..., and Cn may be different from at least one of the other electrostatic capacitances. Even in this case, when one of the n fuses F1, F2, ..., and Fn is blown, the time constant of the resistance voltage decreases, and thus it is possible to detect whether or not there is a blown fuse among the n fuses F1, F2, ..., and Fn.

In the first to fourth embodiments, the position of the circuit switch 30 is not limited to a position upstream of the circuit resistor 31, and may also be a position downstream of the circuit resistor 31. Similarly, the position of the discharge switch 32 is not limited to a position upstream of the discharge resistor 33, and may also be a position downstream of the discharge resistor 33.

In the first to fourth embodiments, the configuration of the DC power source 10 is not limited to a configuration that includes both the electricity generator 20 and the battery 21, and a configuration that does not include the electricity generator 20 may also be adopted.

In the first to fourth embodiments, the configuration of the voltage detection circuit 34 is not limited to a configuration that uses the voltage divider resistors Rd1 and Rd2. The voltage detection circuit 34 may also include a current output unit that outputs a current proportional to the voltage value between the two ends of the circuit resistor 31, that is, the resistance voltage value, and a current resistor through which a current output by the current output unit flows, for example. In this case, the voltage value between the two ends of the current resistor is output to the MICOM 37 as detection information.

The first to fourth embodiments disclosed herein are examples in all respects and should not be interpreted as limiting in any manner. The scope of the present disclosure is defined not by the foregoing meanings, but by the scope of the claims, and is intended to include all modifications that are equivalent to or within the scope of the claims.

The invention claimed is:

1. A blown fuse detection apparatus for detecting whether or not there is a blown fuse among a plurality of fuses respectively disposed on a plurality of current paths branched from one end of a DC power source, the blown fuse detection apparatus comprising:
   a plurality of capacitors that are respectively connected to ends on a downstream side of a corresponding one of the plurality of fuses;
   a current path connected to a downstream side of each of the plurality of capacitors;
   a circuit switch disposed on the current path and configured to open and close the current path;
   and a circuit resistor to which a plurality of currents that have flowed through the plurality of capacitors are input, the circuit switch interposed between the downstream side of each of the plurality of capacitors and the circuit resistor; and
   a processing unit that executes processing,
   wherein the processing unit is configured to detect a blown fuse by executing the following steps:
      instructing the circuit switch to be switched on,
      obtaining a detected value of a resistance voltage between two ends of the circuit resistor that decreases with a lapse of time in a state where the circuit switch is on, and
      determining, based on the obtained detected value, whether or not there is a blown fuse among the plurality of fuses.

2. The blown fuse detection apparatus according to claim 1,
   wherein the processing unit
      obtains the detected value of the resistance voltage overtime in a state where the circuit switch is on,
      determines a time constant of the resistance voltage based on the plurality of obtained detected values, and
      detects, based on the determined time constant, whether or not there is a blown fuse among the plurality of fuses.

3. The blown fuse detection apparatus according to claim 2,
   wherein the processing unit determines whether or not a power source voltage of the DC power source changed while the plurality of detected values were obtained.

4. The blown fuse detection apparatus according to claim 2,
   wherein the processing unit
      inputs the plurality of obtained detected values to a learned model that has been trained on a relation between a time constant of the resistance voltage and a plurality of detected values of the resistance voltage, and
      determines the time constant of the resistance voltage based on output from the learned model.

5. The blown fuse detection apparatus according to claim 1,
   wherein the processing unit
      obtains a power source voltage value of the DC power source,
      obtains a detected value of the resistance voltage at a time point when a predetermined time has elapsed since the circuit switch was switched on, and
      detects, based on the obtained power source voltage value and detected value, whether or not there is a blown fuse among the plurality of fuses.

6. The blown fuse detection apparatus according to claim 5,
   wherein the processing unit determines whether or not the power source voltage of the DC power source changed during a period from when the processing unit instructed that the circuit switch be switched on until when the predetermined time elapsed.

7. The blown fuse detection apparatus according claim 1, further comprising:
   a diode whose anode is connected to the one end of the DC power source; and
   a discharge switch and a discharge resistor through which a current output from a cathode of the diode flows,
   wherein, when the discharge switch is on, a current flows from ends on one side of the capacitors through the fuse, the diode, the discharge resistor, and ends on the other side of the capacitors in the stated order.

8. The blown fuse detection apparatus according to claim 1, further comprising:
   a plurality of diodes whose anodes are respectively connected to ends on a downstream side of the plurality of fuses; and
   a discharge switch and a discharge resistor through which a current output from cathodes of the plurality of diodes flow,
   wherein, when the discharge switch is on, a current flows from ends on one side of the capacitors through the diodes, the discharge resistor, and ends on the other side of the capacitors in the stated order.

9. The blown fuse detection apparatus according to claim 1,
   wherein the processing unit determines whether or not all of the plurality of fuses are blown, based on whether or not the obtained detected value indicates 0 V.

10. A blown fuse detection method for detecting, by a computer, whether or not there is a blown fuse among a plurality of fuses respectively disposed on a plurality of current paths branched from one end of a DC power source, the method includes the steps of:
   providing a plurality of capacitors that are respectively connected to ends on a downstream side of a corresponding one of the plurality of fuses;
   providing a current path connected to a downstream side of each of the plurality of capacitors;
   providing a circuit switch disposed on the current path and configured to open and close the current path;
   providing a circuit resistor to which a plurality of currents that have flowed through the plurality of capacitors are input, the circuit switch interposed between the downstream side of each of the plurality of capacitors and the circuit resistor wherein the method includes a step of instructing, by the computer, that the circuit switch be switched on, a step of obtaining, by the computer, a detected value of a resistance voltage between two ends of the circuit resistor that decreases with a lapse of time in a state where the circuit switch is on, and a step of determining, by the computer, based on the obtained detected value, whether or not there is a blown fuse among the plurality of fuses.

11. A computer program product for detecting whether or not there is a blown fuse among a plurality of fuses respectively disposed on a plurality of current paths branched from one end of a DC power source, in a circuit that includes a plurality of capacitors that are respectively connected to ends on a downstream side of the plurality of fuses, and a circuit switch and a circuit resistor to which a plurality of currents that have flowed through the plurality of capacitors are input, wherein the computer program product comprises a non-transitory, machine-readable medium storing instructions which, when executed by at least one programmable processor, causes at least one programmable processor to perform operations comprising:

a step of instructing that the circuit switch be switched on, a step of obtaining a detected value of a resistance voltage between two ends of the circuit resistor that decreases with a lapse of time in a state where the circuit switch is on, and a step of detecting, based on the obtained detected value, whether or not there is a blown fuse among the plurality of fuses.

* * * * *